United States Patent
Lin et al.

(12)

(10) Patent No.: US 6,262,869 B1
(45) Date of Patent: Jul. 17, 2001

(54) SPIN VALVE SENSOR WITH ENCAPSULATED KEEPER LAYER AND METHOD OF MAKING

(75) Inventors: Tsann Lin, Saratoga; Daniele Mauri, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/365,007

(22) Filed: Aug. 2, 1999

(51) Int. Cl.⁷ .................................................. G11B 5/39
(52) U.S. Cl. ........................................................ 360/324.11
(58) Field of Search .................................. 360/313, 317, 360/324.1, 324.11, 324.12

(56) References Cited

U.S. PATENT DOCUMENTS

| | | | |
|---|---|---|---|
| 5,508,867 | * | 4/1996 | Cain et al. ............................ 360/113 |
| 5,742,162 | * | 4/1998 | Nepela et al. ....................... 324/252 |
| 5,796,561 | * | 8/1998 | Mauri .................................. 360/113 |
| 6,117,569 | * | 9/2000 | Lin et al. ............................. 428/692 |
| 6,127,053 | * | 10/2000 | Lin et al. ............................. 428/692 |

* cited by examiner

*Primary Examiner*—Jefferson Evans
(74) *Attorney, Agent, or Firm*—Gray Cary Ware & Freidenrich; Ervin F. Johnston

(57) ABSTRACT

A spin valve sensor is provided with a keeper layer which forms a partial flux-closure with a reference layer so as to minimize sensitivity of readback signal asymmetry to the sensor stripe height while maintaining a high readback signal. The keeper layer is encapsulated with top and bottom oxide layers, as well as first and second side oxide layers which form contiguous junctions with first and second side edges of the keeper layer. The top oxide layer may be a seed layer for the spin valve sensor for improving its giant magnetoresistance properties. The bottom oxide layer may be an antiferromagnetic film for pinning the magnetic moment of the keeper layer. The first and second side oxide layers function as refill first gap layers for minimizing the risk of electrical shorts between the bottom shield layer and the first and second hard bias and lead layers of the read head.

47 Claims, 22 Drawing Sheets

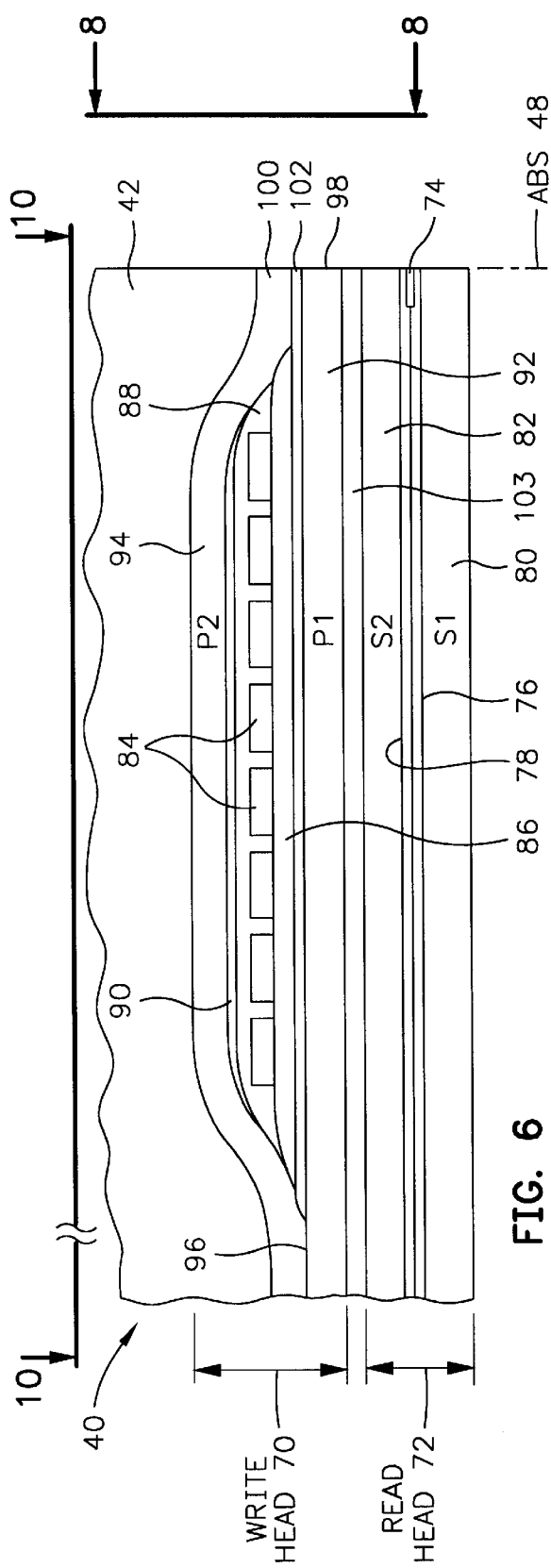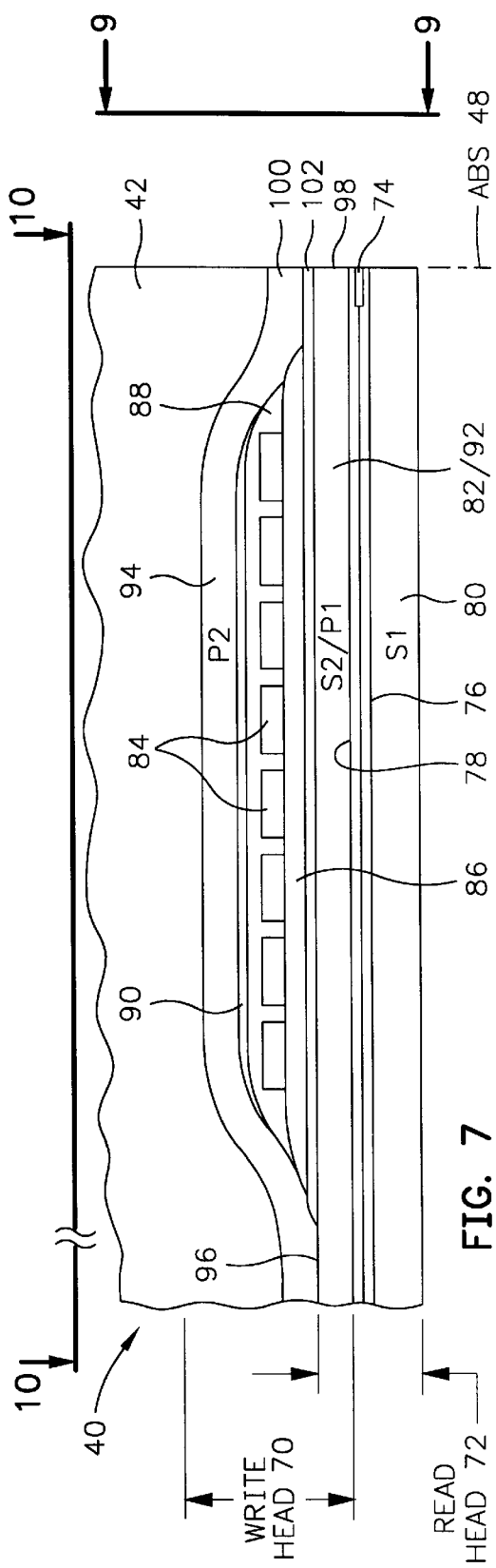

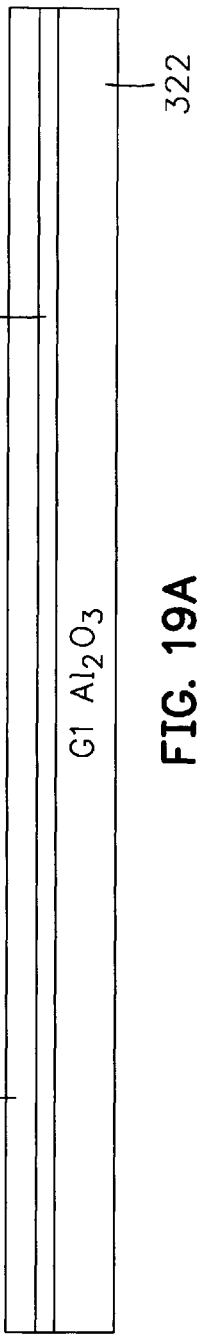
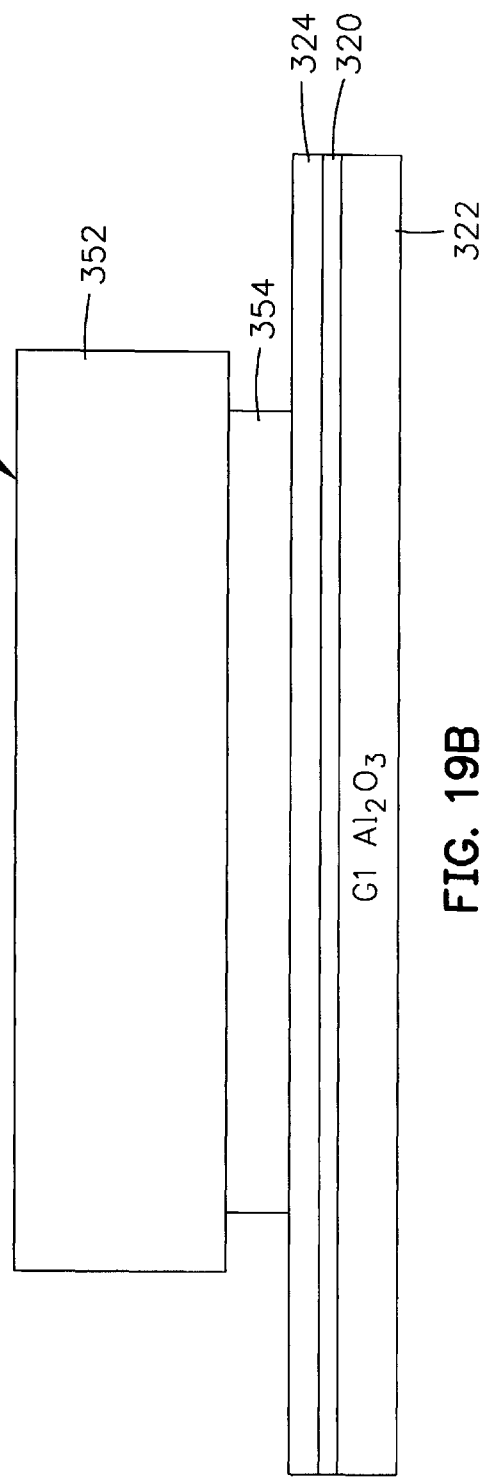

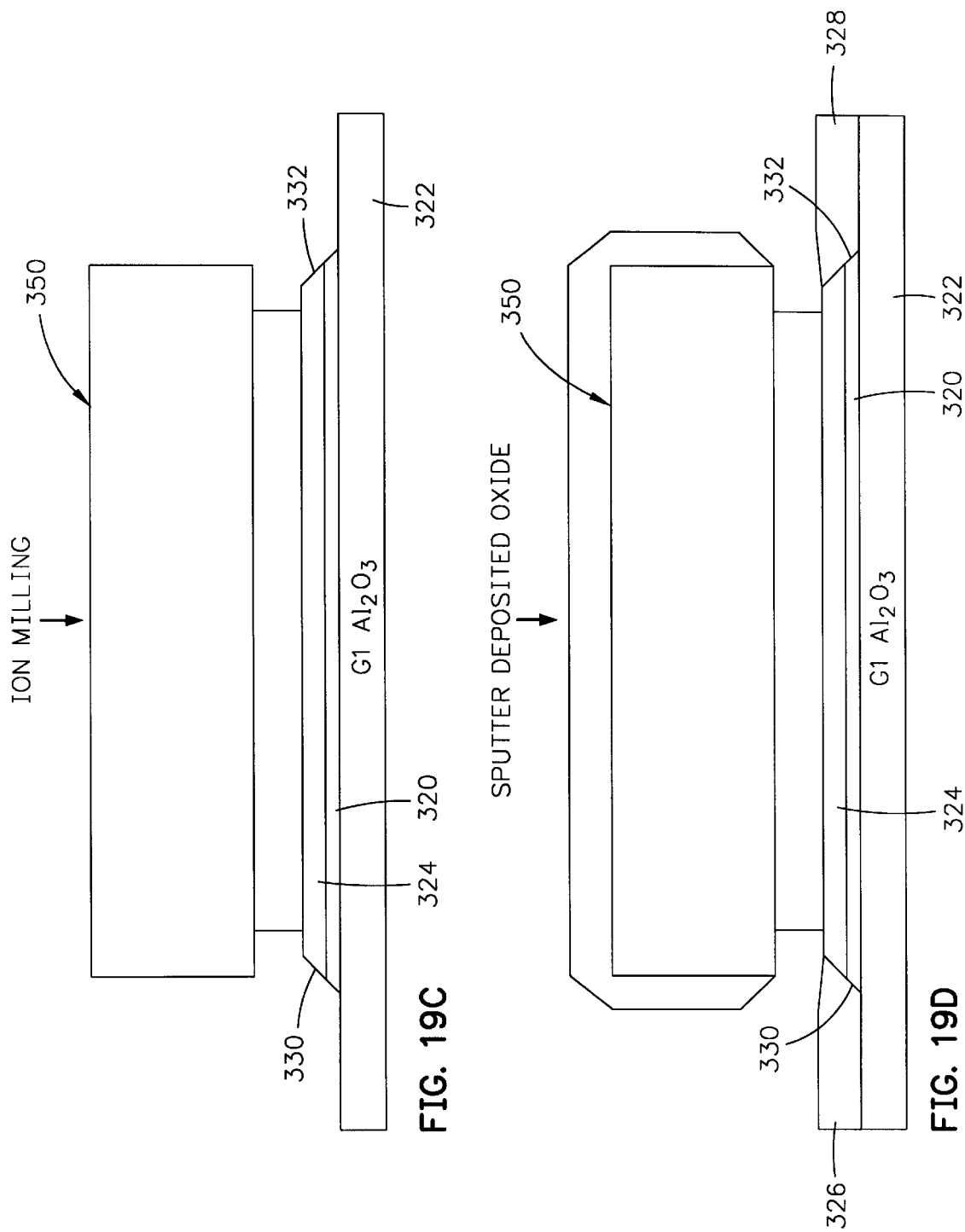

SPIN VALVE SENSOR WITH ENCAPSULATED KEEPER LAYER AND METHOD OF MAKING

BACKGROUND OF THE INVENTION

1. Field of the Invention

The present invention relates to a spin valve sensor in a read head that has an encapsulated keeper layer and more particularly to a keeper layer that is encapsulated by top, bottom, first side and second side insulation oxide layers and to a method of making.

2. Description of the Related Art

A high performance read head typically employs a spin valve sensor for sensing signal fields from a magnetic medium, such as a rotating magnetic disk or a linearly moving magnetic tape. The sensor includes a nonmagnetic electrically high-conductance spacer layer sandwiched between a ferromagnetic reference layer, which is sometimes referred to as a pinned layer, and a ferromagnetic sense layer, which is sometimes referred to as a free layer. An antiferromagnetic pinning layer interfaces the reference layer for pinning the magnetic moment of the reference layer in a direction transverse to an air bearing surface (ABS) which is an exposed surface of the sensor that faces the magnetic medium. First and second hard bias and lead layers are connected to the spin valve sensor for conducting a sense current therethrough. The magnetic moment of the sense layer is free to rotate in positive and negative directions from a quiescent or bias point position in response to positive and negative signal fields from the moving magnetic medium. The quiescent position is the position of the magnetic moment of the sense layer when the sense current is conducted through the sensor without signal fields from the moving magnetic medium. The quiescent position of the magnetic moment of the sense layer is preferably parallel to the ABS. If the quiescent position of the magnetic moment of the sense layer is not parallel to the ABS, the positive and negative responses of the sense layer will not be equal which results in read signal asymmetry which is discussed in more detail hereinbelow.

The thickness of the spacer layer is typically less than the mean free path of electrons conducted through the sensor. With this arrangement, a portion of the conduction electrons are scattered by the interfaces of the spacer layer with the sense and reference layers. When the magnetic moments of the sense and reference layers are parallel with respect to one another scattering is minimal and when their magnetic moments are antiparallel scattering is maximal. An increase in scattering of conduction electrons increases the resistance of the spin valve sensor and a decrease in scattering of the conduction electrons decreases the resistance of the spin valve sensor. A change in resistance of the spin valve sensor is a function of $\cos \theta$, where $\theta$ is the angle between the magnetic moments of the sense and reference layers. The maximum change determines a giant magnetoresistance (GMR) coefficient $\Delta R_G/R$, where $\Delta R_G$ is the change in resistance of the spin valve sensor from minimum resistance where the magnetic moments of sense and reference layers are parallel to maximum resistance where the magnetic moments of the sense and reference layers are antiparallel, and R is the resistance of the spin valve sensor at minimum resistance. For this reason it is sometimes referred to as a GMR sensor.

The transfer curve (magnetoresistance or readback signal of the spin valve head versus signal fields from the moving magnetic medium) of a spin valve sensor is a substantially linear portion of the aforementioned function of $\cos \theta$. The greater this angle, the greater the resistance of the spin valve sensor to the sense current and the greater the readback signal (voltage sensed by the processing circuitry). With positive and negative signal fields from the moving magnetic medium (assumed to be equal in magnitude), it is important that positive and negative changes of the resistance of the spin valve sensor be equal in order that the positive and negative magnitudes of the readback signals are equal. When this occurs a bias point on the transfer curve is considered to be zero and is located midway between the maximum positive and negative readback signals. When the direction of the magnetic moment of the sense layer is parallel to the ABS, and the direction of the magnetic moment of the reference layer is perpendicular to the ABS in a quiescent state, the bias point is located at zero and the positive and negative readback signals will be equal when sensing positive and negative signal fields from the moving magnetic medium. The readback signals are then referred to in the art as having symmetry about the zero bias point. When the readback signals are not equal the readback signals are asymmetric.

The location of the bias point on the transfer curve is influenced by three major forces on the sense layer, namely a ferromagnetic coupling field ($H_F$) between the reference layer and the sense layer, a demagnetizing field ($H_D$) from the reference layer, a sense current-induced field ($H_I$) from all conductive layers of the spin valve sensor except the sense layer.

In the spin valve sensor, the demagnetizing field from the reference layer rotates the magnetic moment of the sense layer toward a first direction perpendicular to the ABS. This demagnetizing field is counteracted by a ferromagnetic coupling field $H_F$ of the reference layer and a sense current-induced field that rotate the magnetic moment of the sense layer toward a second direction antiparallel to the first direction. The sense current-induced field is imposed on the sense layer by the pinning layer (if conductive), the reference layer and the spacer layer, which are all on one side of the sense layer.

In order to minimize the sensitivity of readback signal to the sensor stripe height, the demagnetizing field from the reference layer must be reduced. This can be achieved by providing a ferromagnetic keeper layer on an opposite side of the sense layer from the reference layer with a nonmagnetic electrically low-conductance spacer layer between the sense layer and the keeper layer. With this arrangement the keeper layer provides a flux path for the demagnetizing field from the reference layer and, in turn, the reference layer provides a flux path for the demagnetizing field from the keeper layer. Consequently, the reference and keeper layers provide a nearly closed loop for the demagnetizing fields from both of these layers so that only a small demagnetizing field, resulting from a net magnetic moment between the reference and keeper layers, are imposed on the sense layer to influence its bias point. It is important that the magnetic moment of the keeper layer be oriented antiparallel to the magnetic moment of the reference layer. This can be assured by directing the sense current in a proper direction to the spin valve sensor so that sense current-induced fields urge the magnetic moment of the keeper layer to be antiparallel to the magnetic moment of the reference layer. An additional benefit of the keeper layer is that it exerts a sense current field on the sense layer that is in an opposite direction to the direction of the sense current-induced fields from the pinning layer (if it is conductive), the high-conductance spacer layer and the reference layer, in the sense layer. As a result, both the demagnetizing and sense current-induced fields in the sense layer of the keepered spin valve are much smaller than those in the sense layer of the basic spin valve. In particular, a small demagnetizing field in the sense layer leads to the minimization of the sensitivity of readback signal to the sensor stripe height.

However, a keeper layer shunts a portion of the sense current which reduces the GMR coefficient ($\Delta R_G/R$) of the spin valve sensor. A reduction in $\Delta R_G/R$ causes difficulties in miniaturizing the spin valve sensor while still maintaining high readback signals. A high $\Delta R_G/R$ thus must be maintained for the miniaturized spin valve sensor to exhibit high readback signals and a higher bit density (bits/square inch of the rotating magnetic disk). Efforts over the years have increased the storage capacity of computers from kilobytes to megabytes to gigabytes. The use of a keeper layer defeats these efforts. There is a strong felt need of a keeper layer that does not shunt a portion of the sense current so that bit density can be increased. Ease in a control of read signal asymmetry is also an important factor in increasing bit density.

SUMMARY OF THE INVENTION

The present invention provides a keeper layer that is insulated from the sense current circuit by various oxide layers, such as aluminum oxide ($Al_2O_3$), nickel manganese oxide ($NiMnO_X$) or nickel oxide (NiO) and alpha iron oxide ($\alpha$-$Fe_2O_3$) so that a portion of the sense current is not shunted. The keeper layer is insulated by top and bottom oxide layers, as well as first and second side oxide layers. The first and second side oxide layers make contiguous junctions with first and second side edges of the keeper layer and limit the lateral extension of the keeper layer slightly beyond the track width of the spin valve sensor. The first and second side oxide layers provide additional insulation between the first shield layer and the first and second hard bias and lead layers so as to reduce the risk of electrical shorting between the first shield layer and the hard bias and lead layers. Further, the top and bottom oxide layers can be formed of different oxides which may also be different from the first and second side oxides. The top oxide layer may be used as a seed layer for the spin valve sensor that is constructed thereon to improve its GMR properties. The bottom oxide layer may be used as a seed layer to rigidly pin the magnetic moment of the keeper layer through ferromagnetic/antiferromagnetic coupling in a desired direction.

The aforementioned contiguous junctions formed between the first and second side edges of the keeper layer and the first and second side oxide layers respectively is implemented by a process which is typically employed for forming contiguous junctions between first and second side edges of the spin valve sensor with first and second lead layers respectively and is fully described in commonly assigned U.S. Pat. No. 5,018,037 which is incorporated by reference herein. After forming full film keeper and top oxide layers a bilayer photoresist is formed where a portion of these layers are to be retained. Ion milling is implemented to remove side portions of materials of these layers beyond the bilayer photoresist and the first and second side oxide layers are immediately deposited which form the contiguous junctions. The process is complete after removal of the bilayer photoresist which lifts off unwanted portions of materials of the first and second side oxide layers thereon. Thereafter, materials for the spin valve sensor are deposited and the same process is implemented for forming contiguous junctions between the first and second side edges of the spin valve sensor with the first and second hard bias and lead layers.

An object of the present invention is to provide a high GMR coefficient ($\Delta R_G/R$) for a spin valve sensor that employs an encapsulated keeper layer.

Another object is to isolate a keeper layer from a sense current circuit by various oxide layers which may be different from one another.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIG. 19A is an ABS illustration of first steps in forming the spin valve sensor shown in FIG. 18 wherein a bottom oxide layer, a keeper layer and a top oxide layer have been sputter-deposited;

FIG. 19B is the same as FIG. 19A except a bilayer photoresist has been formed on the top oxide layer;

FIG. 19C is the same as FIG. 19B except ion milling has been implemented to remove portions of the keeper layer and the top oxide layer unmasked by the bilayer photoresist;

FIG. 19D is the same as FIG. 19C except an oxide layer has been sputter-deposited to form first and second side oxide layers that make contiguous junctions with first and second side edges of the keeper and top oxide layers;

DESCRIPTION OF THE PREFERRED EMBODIMENTS

Magnetic Disk Drive

Figure 1:
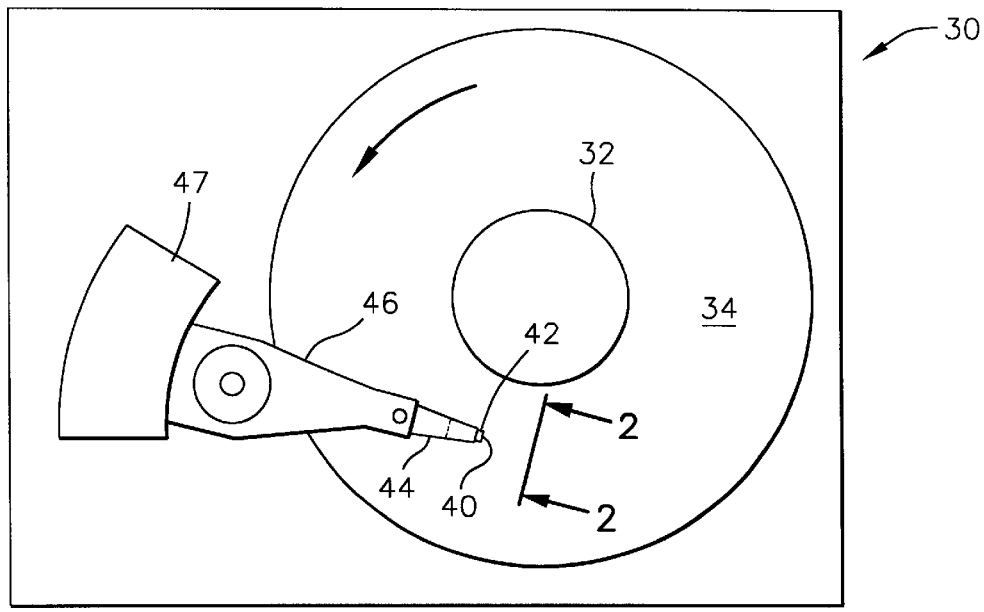
FIG. 1 is a plan view of an exemplary magnetic disk drive.
Figure 2:
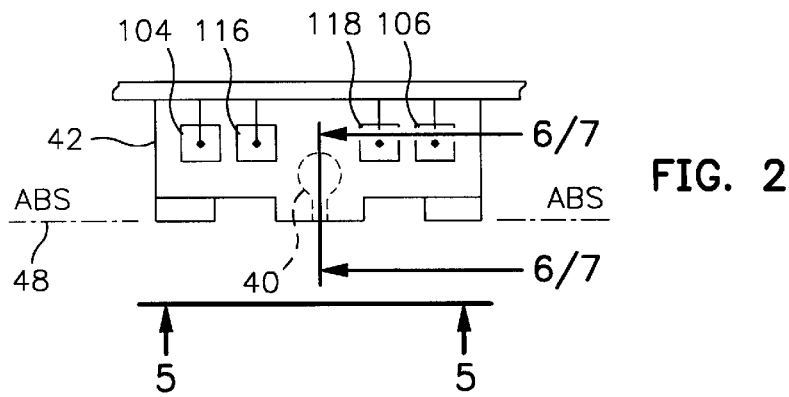
FIG. 2 is an end view of a slider with a magnetic head of the magnetic disk drive as seen in plane 2—2.
Figure 3:
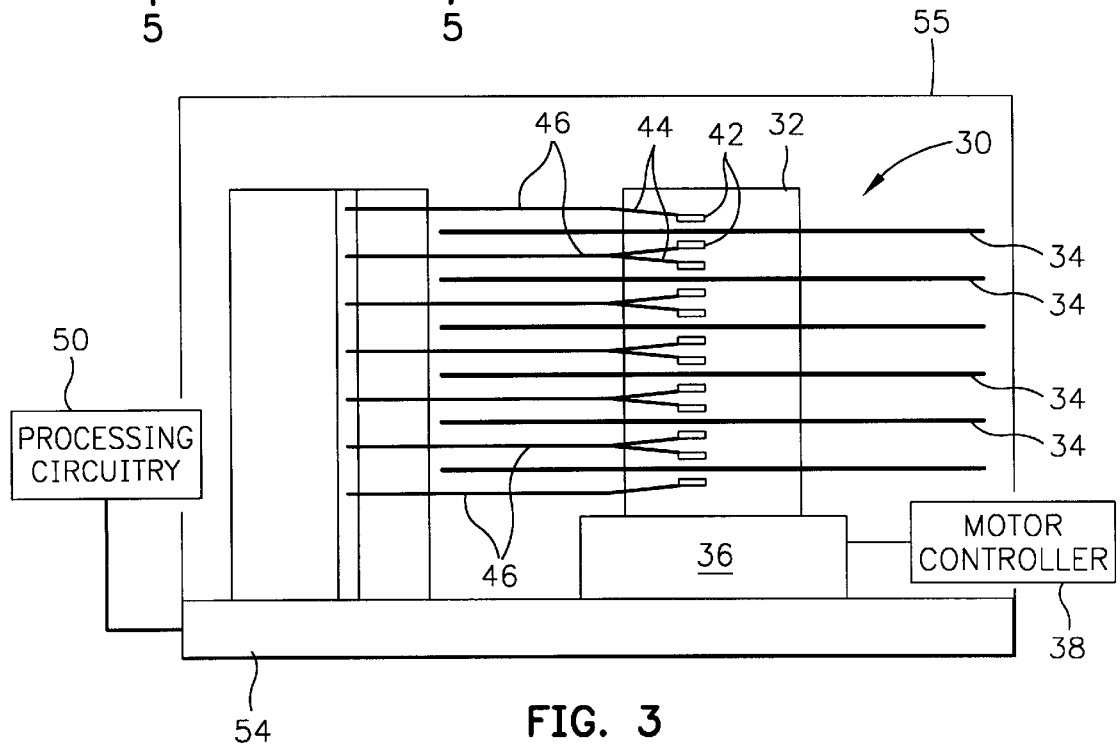
FIG. 3 is an elevation view of the magnetic disk drive wherein multiple magnetic disks and magnetic heads are employed.
Figure 4:
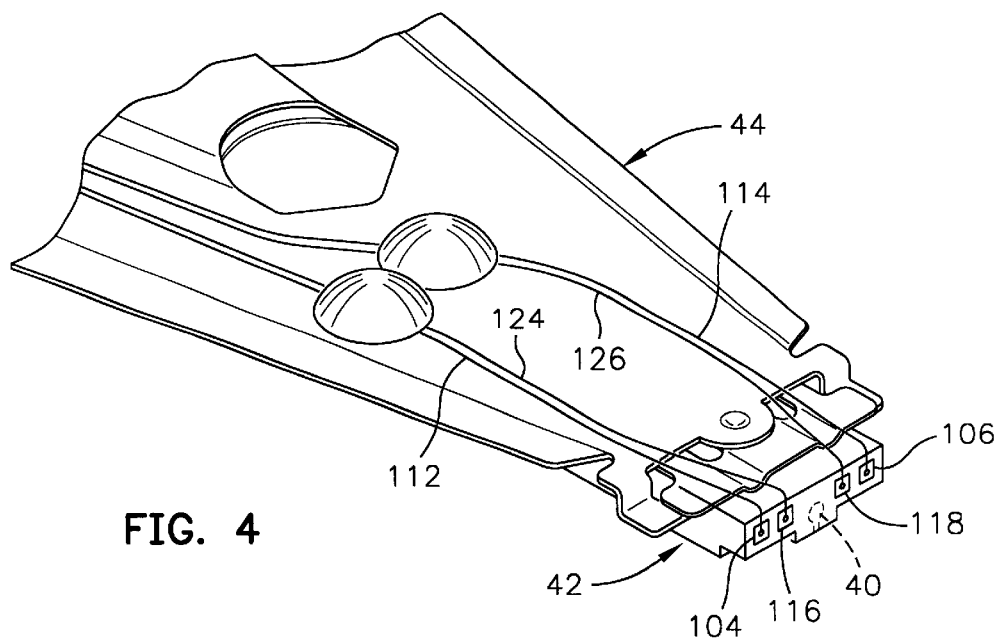
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The disk drive 30 includes a spindle 32 that supports and rotates a magnetic disk 34. The spindle 32 is rotated by a spindle motor 36 that is controlled by a motor controller 38. A combined read and write magnetic head 40 is mounted on a slider 42 that is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
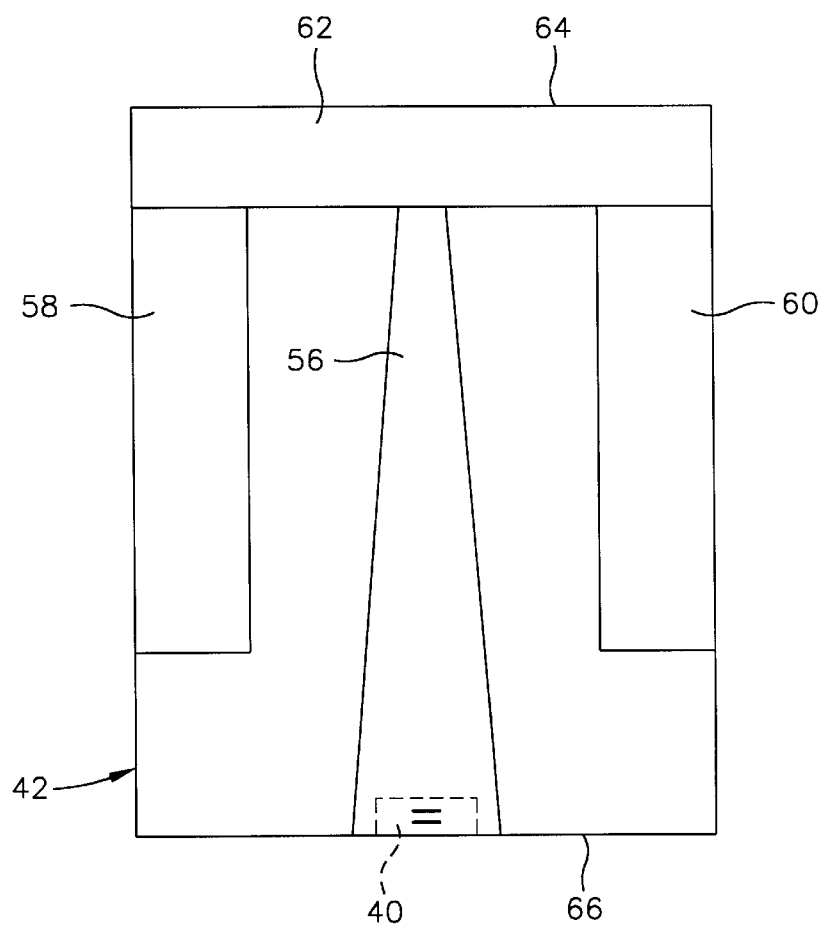
FIG. 5 is an ABS view of the magnetic head taken along plane 5—5 of FIG. 2.
Figure 10:
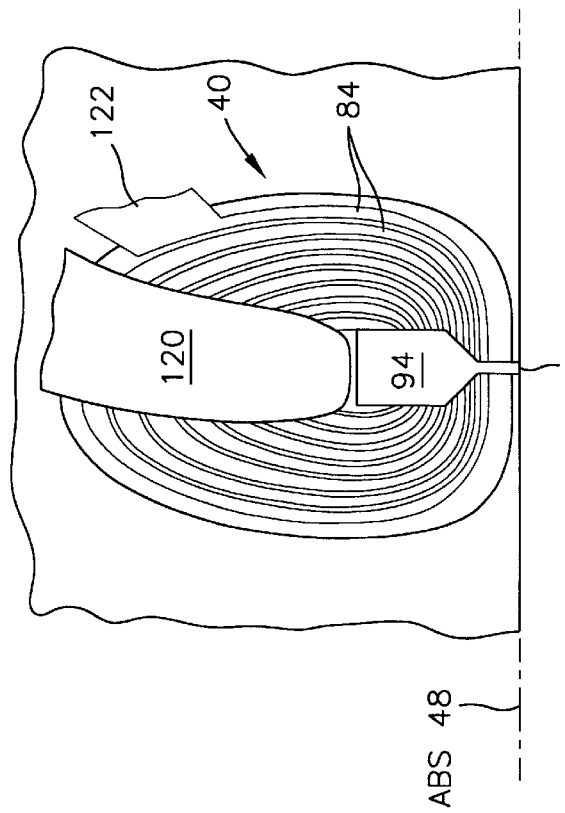
FIG. 10 is a view taken along plane 10—10 of FIGS. 6 or 7 with all materials above the coil layer and leads removed.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
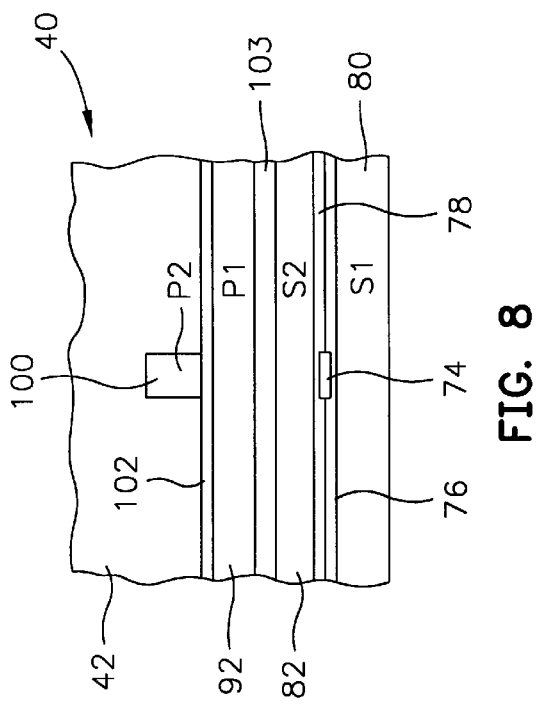
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative top and bottom read gap layers (G2 and G1) 78 and 76, and the read gap layers are sandwiched between ferromagnetic top and bottom shield layers (S2 and S1) 82 and 80. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3. The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between top and bottom pole piece layers (P2 and P1) 94 and 92. The top and bottom pole piece layers 94 and 92 are magnetically coupled at a back gap 96 and have top and bottom pole tips 100 and 98 which are separated by a write gap layer 102 at the ABS. An insulation layer 103 is located between the top shield layer 82 and the bottom pole piece layer 92. Since the top shield layer 82 and the bottom pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension 44.

Figure 9:
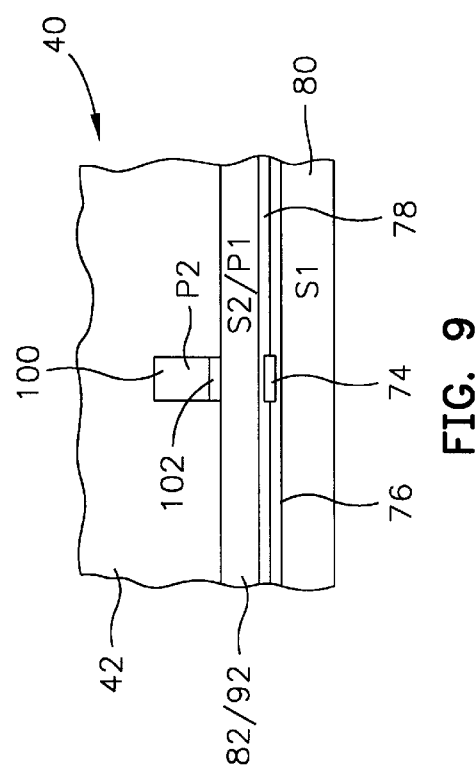
FIG. 9 is a partial ABS view of the slider taken along plane 9—9 of FIG. 7 to show the read and write elements of the merged magnetic head.

FIGS. 7 and 9 are the same as FIGS. 6 and 8 except the top shield layer 82 and the bottom pole piece layer 92 are a common layer. This type of head is known as a merged magnetic head. The insulation layer 103 of the piggyback head in FIGS. 6 and 8 is omitted.

Figure 11:
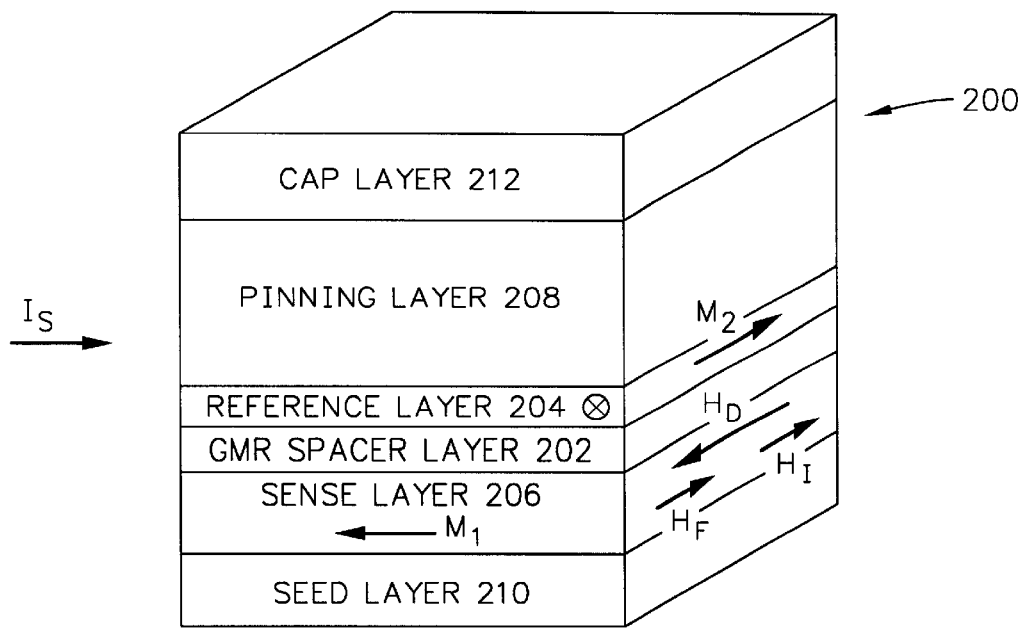
FIG. 11 is an ABS isometric illustration of a basic spin valve sensor without a keeper layer.

FIG. 11 shows a basic spin valve sensor 200 which includes a nonmagnetic high-conductance GMR spacer layer 202 which is located between a ferromagnetic reference layer 204 and a ferromagnetic sense layer 206. The sense layer 206 has a magnetic moment $M_1$ which is typically oriented parallel to the ABS and the reference layer 204 has a magnetic moment $M_2$ which is typically oriented in a transverse direction perpendicular to the ABS. The magnetic moment $M_2$ of the reference layer 204 is pinned by an antiferromagnetic (AFM) pinning layer 208 which has magnetic spins interfacing the reference layer 204 for pinning the magnetic moment $M_2$ in the transverse direction. For a sense current Is flowing from left to right the magnetic moment $M_2$ must be directed perpendicular to and away from the ABS. A sense layer 206 is shown formed on a seed layer 210, which may be tantalum (Ta), and a cap layer 212, which may also be tantalum (Ta), may be on the pinning layer 208 for its protection. This basic spin valve is described in a commonly assigned U.S. Pat. No. 5,206,590 which is incorporated by reference herein.

Ferromagnetic/antiferromagnetic coupling occurs between the reference and pinning layers 204 and 208, producing a unidirectional anisotropy field ($H_{UA}$). This $H_{UA}$ must be high enough to rigidly pin the magnetization ($M_2$) of the reference layer 204 in a transverse direction perpendicular to and away from the ABS for proper sensor operation. Ferromagnetic/ferromagnetic coupling also occurs across the GMR spacer layer 202, producing a ferromagnetic coupling field ($H_F$) on the sense layer 206.

To achieve optimal biasing, $H_F$ must be precisely controlled so that, $$H_D = H_F + H_I$$

where $H_D$ is a demagnetizing field in the sense layer (produced by magnetostatic coupling between the sense and reference layers) and $H_I$ is a sense current-induced field in the sense layer. To ensure this field balance in the basic spin valve for the sense current $I_S$ flowing from left to right, as shown in FIG. 11, $M_2$ must be oriented away from the ABS. With this field balance, the magnetization of the sense layer ($M_1$) is oriented in a longitudinal direction parallel to the ABS in the absence of a signal field. During sensor operation, $M_1$ rotates in response to signal fields while $M_2$ remains unchanged. This $M_1$ rotation changes the giant magnetoresistance of the basic spin valve by ($\Delta R_G/R$) (R/2) sin θ, where $\Delta R_G/R$ is a GMR coefficient, $\Delta R_G$ is a difference between the resistance measured when $M_1$ is antiparallel to $M_2$ and the resistance (R) measured when $M_1$ is parallel to $M_2$, and θ is a rotation angle from the longitudinal direction.

In the head fabrication process, the basic spin valve 200 is lapped to a designed sensor stripe height. Since $H_D$ is inversely proportional to the sensor stripe height, a precise control in the sensor stripe height is needed to attain a designed $H_D$. This control, however, is difficult when lapping the basic spin valve to a submicron sensor stripe height for high density recording. As a result, it is difficult to achieve optimal biasing and minimize the sensitivity of readback signal asymmetry to the sensor stripe height.

In the basic spin valve 200 where the sense current flows from left to right, the sense current-induced field ($H_I$) in the reference layer 204 is antiparallel to $M_2$. During sensor operation, it is required that at sensor operating temperatures (≧140° C.), $H_{UA}$ be at least greater than 300 Oe, to counteract the net sum of demagnetizing fields, sense current-induced and ferromagnetic/ferromagnetic coupling fields ($H'_D + H'_I - H_F$) in the reference layer, as well as fields from recorded data and from hard bias layers. If the $H_{UA}$ is not high enough, $M_2$ will be canted from the desired transverse direction, and the output signal and dynamic range of the sensor operation will be reduced. In addition, analysis of the magnetic state of the reference layer 204 in a submicron sensor with 0.5 μm in width and 0.5 μm in height reveals that due primarily to the large demagnetizing fields at the edges of the reference layer 204, the desired transverse magnetization is achieved only at the center of the reference layer, while the magnetization tends to be curled into a direction parallel to the ABS at the edges of the reference layer. The high demagnetizing fields will lead to the sensitivity of readback signal asymmetry to the sensor stripe height, and the non-uniform demagnetizing fields in the reference layer 204 will cause difficulties in determining optimal biasing. The existence of demagnetizing fields in the sense and reference layers thus pose technical challenges in the use of the basic spin valve for high density recording.

Figure 12:
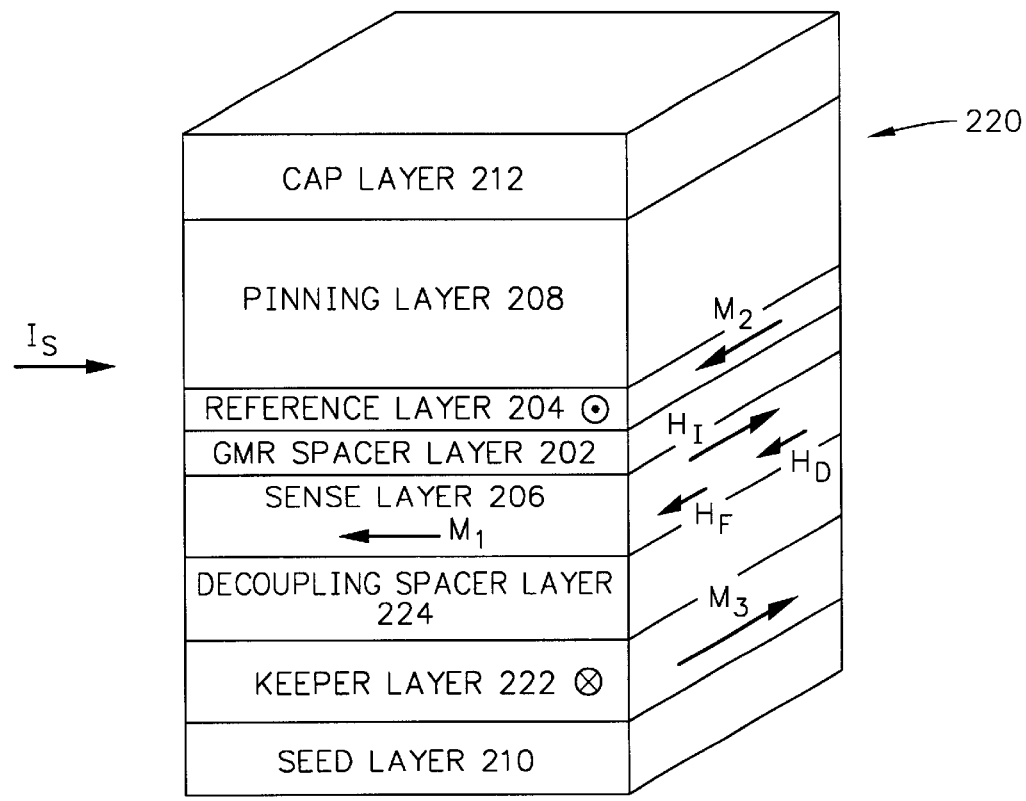
FIG. 12 is an ABS isometric illustration of a keepered spin valve sensor and is the same as FIG. 11 except for the addition of a keeper layer and a decoupling low-conductance spacer layer.

FIG. 12 illustrates a keepered spin valve sensor which is the same as the spin valve sensor 200 shown in FIG. 11 except a ferromagnetic keeper layer 222 and a nonmagnetic low-conductance decoupling spacer layer 224 are located between the seed layer 210 and the sense layer 206. The keeper layer 222 has a magnetic moment $M_3$ which is antiparallel to the magnetic moment $M_2$ of the reference layer 204. The keepered spin valve sensor 220 shown in FIG. 12 is described in a commonly assigned U.S. Pat. No. 5,508,867 which is incorporated by reference herein.

Figure 13:
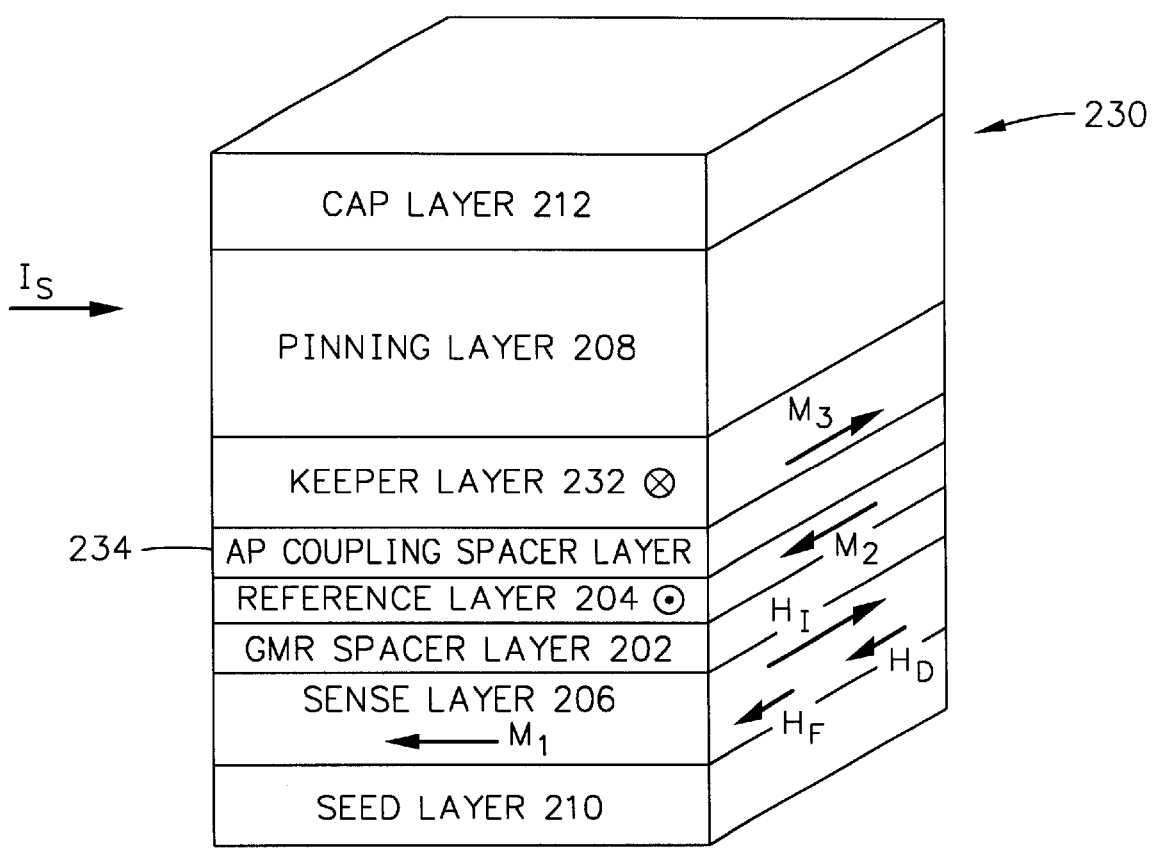
FIG. 13 is an ABS isometric illustration of an antiparallel coupled spin valve sensor wherein an antiparallel coupled structure provides a reference layer and a keeper layer.

In FIG. 13 an antiparallel coupled keepered spin valve sensor 230 is shown. This spin valve sensor is the same as the spin valve sensor 200 shown in FIG. 11 except a ferromagnetic keeper layer 232 and a non-magnetic antiparallel (AP) coupling spacer layer 234 are provided wherein the AP coupling spacer layer 234 is located between the reference layer 204 and the keeper layer 232. The reference layer 204 and the keeper layer 232 are coupled by an antiparallel exchange coupling which causes a magnetic moment $M_3$ of the keeper layer to be antiparallel to the magnetic moment $M_2$ of the reference layer 204. The AP coupled keepered spin valve sensor 230 shown in FIG. 13 is described in a commonly assigned U.S. Pat. No. 5,701,223 which is incorporated by reference herein.

The keeper layer in each of the keepered spin valves 220 and 230 is used to provide a partial flux closure for stray fields from the reference layer 204 through magnetostatic interactions between the reference and keeper layers, thereby substantially reducing demagnetizing fields in the sense and reference layers 206 and 204, and more importantly, providing uniform demagnetizing fields in the entire sense and reference layer. As a result, the sensitivity of readback signal asymmetry to the sensor stripe height is minimized.

Since $H_D$ is substantially reduced to be smaller than $H_I$ in the sense layer 206 of the keepered spin valve sensors 220 and 230, the field balance in the sense layer 206 for optimal biasing becomes $$H_I = H_F + H_D$$

To ensure the field balance $M_2$ in the keepered spin valve sensors 220 or 230 for the sense current flowing from left to right needs to be oriented toward the ABS (FIGS. 12 and 13). It should be noted that a very small amount of $H_D$ is needed and it can be attained by designing a net magnetic moment between the reference and keeper layers in the keepered spin valve sensors 220 and 230. Where the sense current flows from left to right, $H_I$ is now parallel to $M_2$. As a result, the requirement of a high $H_{UA}$ is alleviated since the net sum of three fields ($H'_D$–$H'_I$–$H_F$) in the reference layer to counteract $H_{UA}$ is smaller.

Prior Art

An ideal keeper layer must exhibit high corrosion resistance and good soft-magnetic properties, such as a low easy-axis coercivity ($H_{CE}$), a low hard-axis coercivity ($H_{CH}$), a low uniaxial anisotropy field ($H_K$) and a zero saturation magnetostriction ($M_S$). In addition, the keeper layer must have a large product of saturation magnetization ($M_S$) and non-magnetic electrical resistivity ($\rho_o$) so that only a small fraction of sense current will flow through the keeper layer. The low current shunting will cause a small signal loss.

Ni-Fe and Ni-Fe-Cr films, which have been extensively used as sense and soft-adjacent layers of an anisotropy magnetoresistive sensor, respectively, are two suitable keeper layers. Table 1 shows magnetic and electrical properties of 82.5Ni-17.5Fe (8.5 nm) and 77Ni-19Fe-4Cr (11 nm) films (in atomic percent) sandwiched into $Al_2O_3$ (20 nm) films and annealed for 2 hours at 280° C. After anneal, the magnetic moments of the Ni-Fe and Ni-Fe-Cr films are identical (0.56 emu/cm$^2$). Both films exhibit good soft-magnetic properties but low $M_S\rho_o$ products which will cause high current shunting.

TABLE 1

Properties of Ni—Fe(8.5 nm) and Ni—Fe—Cr(11 nm) films sandwiched into $Al_2O_3$ (20 nm) films and annealed for 2 hours at 280° C.

| Properties | 82.5Ni—17.5Fe | 77Ni—19Fe—4Cr |
|---|---|---|
| $H_{CE}$ (Oe) | 1.0 | 1.7 |
| $H_{CH}$ (Oe) | 0.1 | 0.1 |
| $H_K$ (Oe) | 8.0 | 4.2 |
| $\lambda_S$ (× 10$^{-6}$) | +1.0 | −2.2 |
| $M_S$ (emu/cm$^3$) | 750 | 560 |
| $\rho_o$ ($\mu\Omega$-cm) | 44 | 63 |
| $M_S\rho_o$ (× 10$^3$ emu $\mu\Omega$/cm$^2$) | 32.6 | 35.3 |

Figure 14:
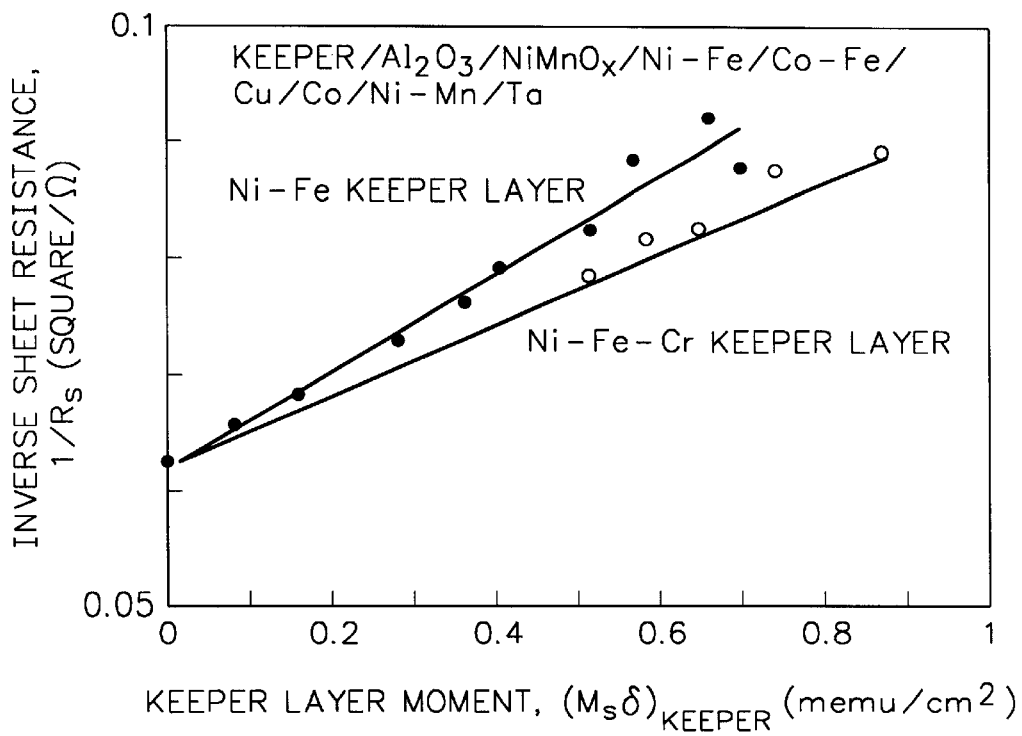
FIG. 14 is a graph showing inverse sheet resistance versus keeper layer moment for a spin valve sensor having a nickel iron (Ni-Fe) keeper layer and a spin valve sensor having a nickel iron chromium (Ni-Fe-Cr) keeper layer.
Figure 15:
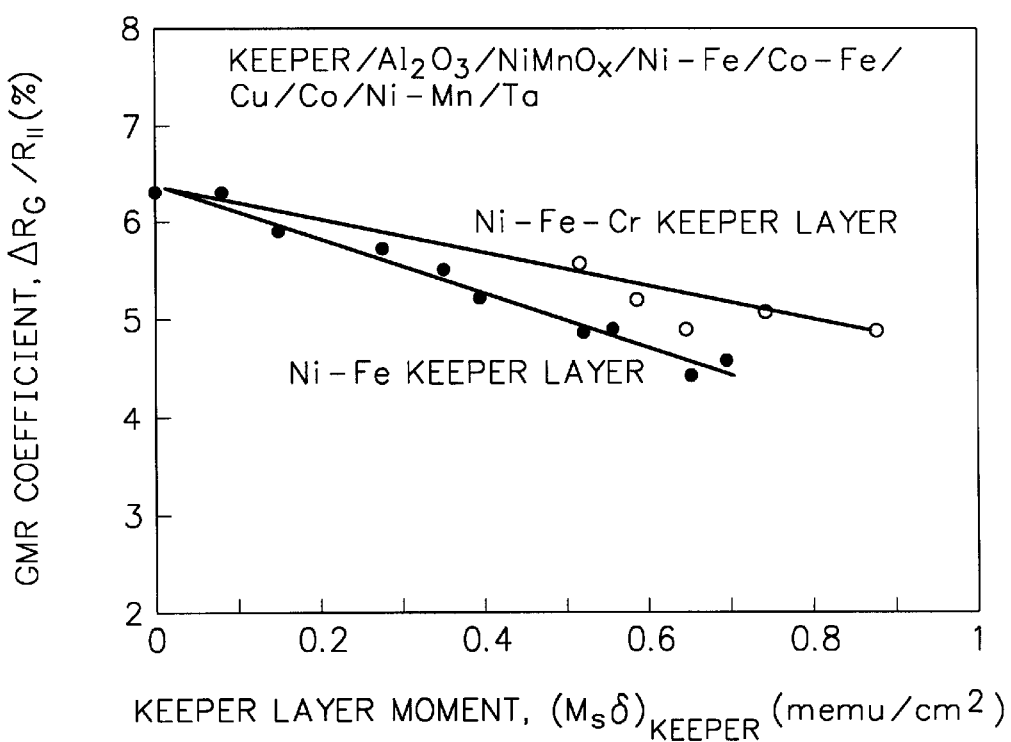
FIG. 15 is a graph illustrating GMR coefficient versus keeper layer moment of the same spin valve sensors shown in FIG. 14.

In addition to the high current shunting, the uses of these keeper layers will cause a decrease in GMR coefficients. FIG. 14 shows the inverse sheet resistance (1/$R_S$) versus the keeper layer moment $(M_s\delta)_{Keeper}$ and FIG. 15 shows GMR coefficient versus the keeper layer moment, $(M_s\delta)_{Keeper}$ where $\delta$ is the keeper layer thickness for a basic Ni-Mn spin valve and Ni-Mn spin valves with Ni-Fe and Ni-Fe-Cr keeper layers. The basic Ni-Mn spin valve comprises NiMnO$_X$(3)/Ni-Fe(6)/Co-Fe(0.6)/Cu(2.8)/Co(3.2)/Ni-Mn(25)/Ta(5) films (thickness in nm), the Ni-Mn spin valve with the Ni-Fe keeper layer comprises $Al_2O_3$(3)/Ni-Fe/$Al_2O_3$(3)/NiMnO$_X$(3)/Ni-Fe(6)/Co-Fe(0.6)/Cu(2.8)/Co(3.2)/Ni-Mn(25)/Ta(5) films, and the Ni-Mn spin valve with the Ni-Fe-Cr keeper layer comprises $Al_2O_3$(3)/Ni-Fe-Cr/$Al_2O_3$(3)/NiMnO$_X$(3)/Ni-Fe(6)/Co-Fe(0.6)/Cu(2.8)/Co(3.2)/Ni-Mn(25)/Ta(5) films. These basic and keepered spin valves are deposited in a magnetic field of 40 Oe in a DC magnetron or ion-beam sputtering system, and are annealed for 2 hours at 280° C. in a magnetic field of 800 Oe in a high vacuum oven to develop exchange coupling between the Co and Ni-Mn films. After anneal, the magnetic moments of the Ni-Fe/Co-Fe sense and Co reference layers are 0.48 and 0.44 memu/cm$^2$, respectively. The slopes of straight lines shown in FIG. 14 determine reciprocals of $M_S\rho_o$. The Ni-Fe keeper layer exhibits $M_S\rho_o$ lower than the Ni-Fe-Cr keeper layer. FIG. 15 shows that GMR coefficients for both types of keepered spin valves decrease with the keeper layer moment. For a fixed designed keeper layer moment, the Ni-Mn spin valve with the Ni-Fe-Cr keeper layer exhibits a high GMR coefficient.

It is thus crucial to improve the read sensor design by incorporating a keeper layer into the basic spin valve structure, while maintaining the merits of the basic spin valve. In this invention, a fabrication process of a spin valve sensor with an encapsulated keeper layer is proposed. While the desired partial flux-closure structure is attained, current shunting is eliminated and a high GMR coefficient is maintained.

First Embodiment of the Invention

Figure 16:
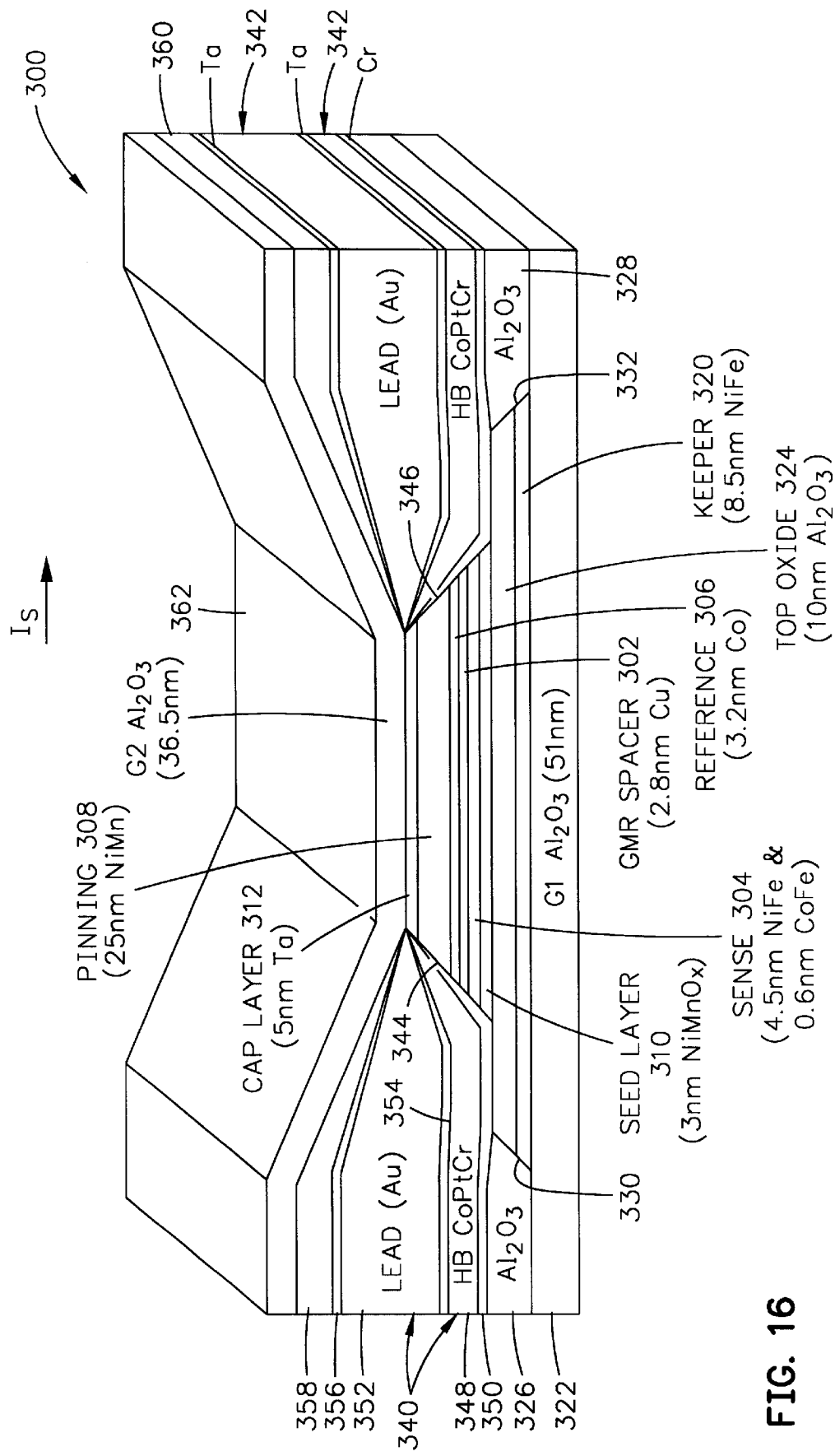
FIG. 16 is an ABS isometric illustration of a first embodiment of the present spin valve sensor with an encapsulated keeper layer.

FIG. 16 shows a first embodiment 300 of the present keepered spin valve sensor wherein a keeper layer 320 is fully insulated from a sense current circuit so as to eliminate shunting of the sense current. The sensor 300 includes a nonmagnetic electrically high-conductance GMR spacer layer 302, which may be 2.8 nm of copper (Cu), which is located between a ferromagnetic sense layer 304, which may be 4.5 nm of nickel iron (Ni-Fe) and 0.6 nm of cobalt iron (Co-Fe), and a ferromagnetic reference layer 306, which may be 3.2 nm of cobalt (Co). The reference layer 306 is exchange coupled to an antiferromagnetic (AFM) pinning layer 308, which may be 25 nm of nickel manganese (Ni-Mn), for orienting the magnetic moment ($M_2$) of the reference layer perpendicular to the ABS in a direction toward the ABS (for a sense current $I_S$ flowing from left to right). The sense layer 304 may be formed on a nonmagnetic seed layer 310, which may be 3 nm of nickel manganese oxide (NiMnO$_X$). A nonmagnetic cap layer 312, which may be 5 nm of tantalum (Ta), may be provided on the pinning layer 308 for its protection.

A ferromagnetic keeper layer 320, which may be 8.5 nm of nickel iron (Ni-Fe), is located on an oxide layer such as the bottom read gap layer ($G_I$) 322, which may be 51 nm of aluminum oxide ($Al_2O_3$) for a spin valve sensor with a 150 nm read gap. A top oxide layer 324, such as 10 nm of aluminum oxide ($Al_2O_3$), is located between the keeper layer 320 and the seed layer 310. First and second side oxide layers 326 and 328, which may be 20 nm of aluminum oxide ($Al_2O_3$), make contiguous junctions with first and second side edges 330 and 332 of the keeper layer 320 as well as first and second side edges of the top oxide layer 324. The keeper layer has a recessed edge (not shown) which is insulated from the sense current by an overcoat insulation layer (not shown) and is referred to hereinafter as an encapsulated keeper layer even though it has an exposed edge at the ABS.

First and second hard bias (HB) and lead layers 340 and 342, as well as the third and fourth side oxide layers 358 and 360, are on the first and second side oxide layers 326 and 328 as well as on top portions of the top oxide layer 324, and make contiguous junctions with first and second side edges 344 and 346 of the spin valve sensor. Each hard bias layer may include a 3.5 nm of chromium (Cr) film 350 and a 15 nm of cobalt platinum chromium (Co-Pt-Cr) film 348. Each lead layer may include a 40 nm of gold (Au) film 352 located between first and second 5 nm of tantalum (Ta) films 354 and 356. Third and fourth side oxide layers 358 and 360, which may be 20 nm of aluminum oxide ($Al_2O_3$), may be located on the first and second lead layers. A nonmagnetic nonconductive top read gap layer 362, which may be 36.5 nm of aluminum oxide ($Al_2O_3$), may be located on the third and fourth side oxide layers 358 and 360 and the spin valve sensor.

Without concerns of current shunting to the encapsulated keeper layer 420, the $M_S\rho_o$ product becomes not a figure of merit for the selection of the encapsulated keeper layer material. The Ni-Fe film is thus considered as the best suitable encapsulated keeper layer due to its well known good soft magnetic properties and nearly zero saturation magnetostriction. Other soft magnetic films such as Ni-Fe-Cr, Ni-Fe-Rh, etc. can also be used as the encapsulated keeper layer.

Figure 17:
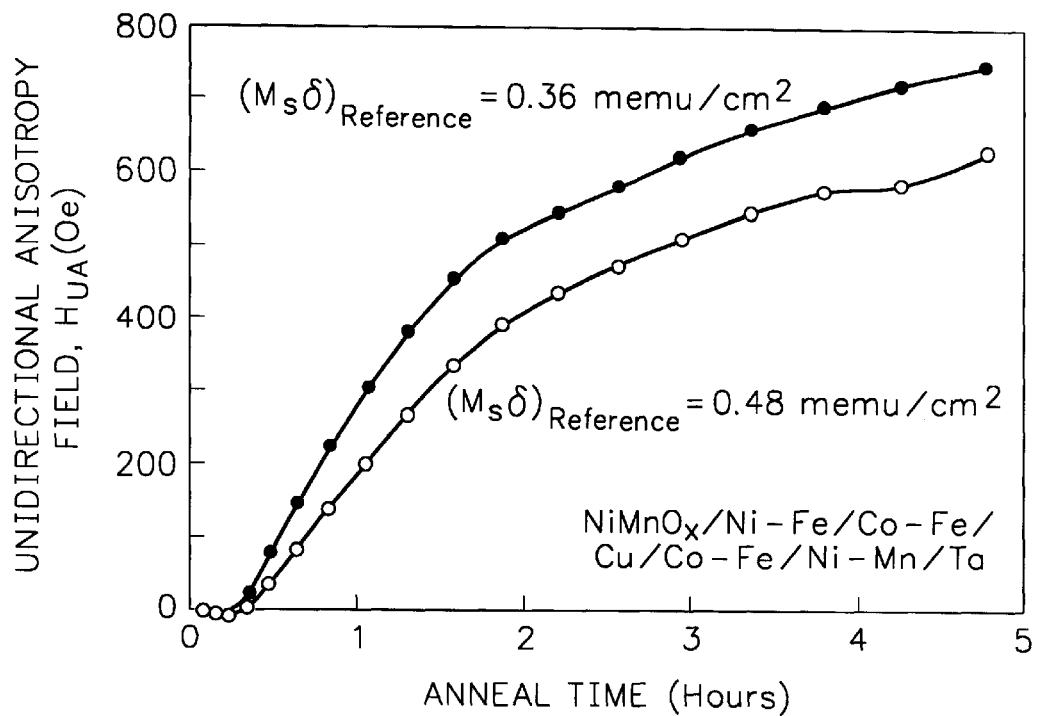
FIG. 17 is a graph showing unidirectional anisotropy field versus anneal time for Ni-Mn basic spin valve sensors wherein the reference layers have different magnetic moments.
Figure 18:
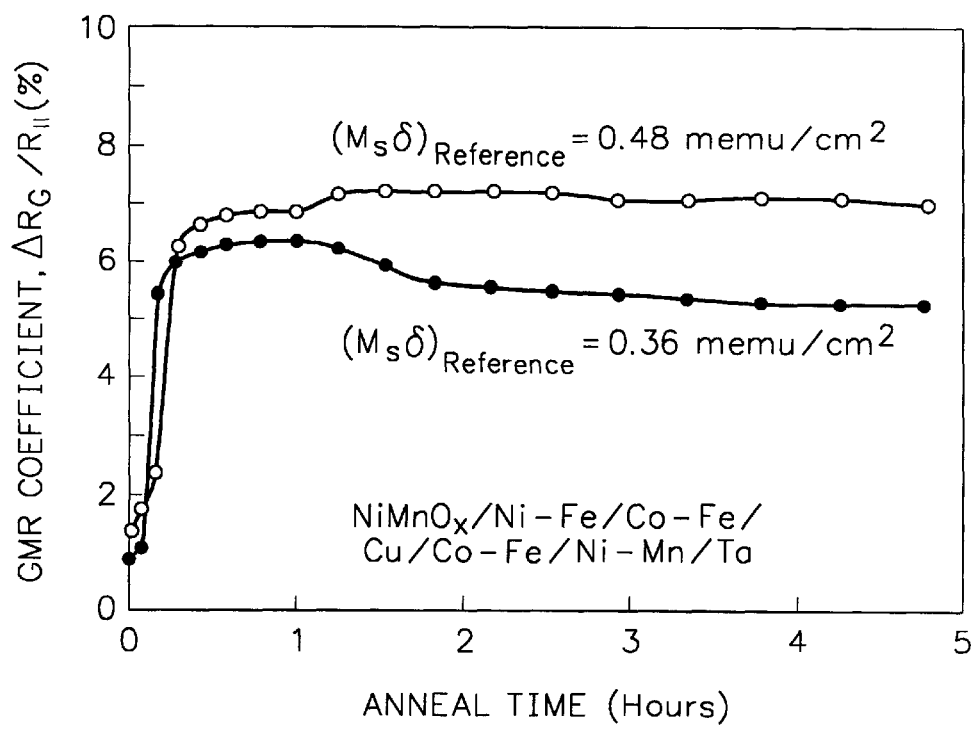
FIG. 18 is a graph showing GMR coefficient versus anneal time for the same basic spin valve sensors shown in FIG. 17.

The GMR coefficient of the Ni-Mn spin valve with the encapsulated Ni-Fe keeper layer is basically identical to that of a basic Ni-Mn spin valve due to no current shunting into the keeper layer. FIGS. 17 and 18 show the $H_{UA}$ and GMR coefficients of two basic Ni-Mn spin valves comprising NiMnO$_X$(3)/Ni-Fe(4.5)/Co-Fe(0.6)/Cu(2.8)/Co-Fe/Ni-Mn (25)/Ta(5) films versus anneal time at 280° C. After anneal, the sense layer has a magnetic moment of 0.36 memu/cm² (smaller than that described in the prior art for higher density recording), and the reference layer has a magnetic moment of 0.48 or 0.36 memu/cm². As anneal proceeds, $H_{UA}$ increases while the GMR coefficient reaches a maximum value and then starts to gradually decrease. For the Ni-Mn spin valves annealed for 2 h at 280° C., a decrease in the reference layer moment from 0.48 to 0.36 memu/cm² causes an increase in $H_{UA}$ from 414 to 570 Oe, but a decrease in the GMR coefficient from 7.3% to 5.6%. In the design of a basic spin valve, a thin Co-Fe reference layer with a low magnetic moment ($\leq 0.36$ memu/cm²) must be used to ensure a high $H_{UA}$ and to minimize $H_D$. In the design of a spin valve with an encapsulated keeper layer, on the other hand, a thicker Co-Fe reference layer can be used since the requirement of $H_{UA}$ is alleviated and $H_D$ can still be maintained low if the net moment between the keeper and reference layers is still maintained small ($\leq 0.12$ memu/cm²). As a result, the GMR coefficient of the Ni-Mn spin valve with the encapsulated Ni-Fe keeper layer can be higher than that of the basic Ni-Mn spin valve due to the use of a thicker Co-Fe reference layer in the keepered spin valve.

The keeper layer 320 is encapsulated by the top and bottom oxide layers 324 and 322 as well as the first and second side oxide layers 326 and 328, so that a portion of the sense current is not shunted through the keeper layer 320. The keeper layer 320 and the top oxide layer 324 extend laterally beyond the spin valve sensor but are limited in their extensions by the first and second side oxide layers 326 and 328. The uses of the first and second side oxide layers 326 and 328 are important because the keeper layer 320 is an electrically conductive layer and can cause shorting between the bottom shield layer ($S_1$ shown in FIGS. 6 and 7) and the first and second hard bias and lead layers 340 and 342 shown in FIG. 18. Accordingly, the first and second side oxide layers 326 and 328 provide refill insulation between the bottom shield layer and the first and second hard bias and lead layers 340 and 342 so that potential pin holes in the read gap layer 322 are covered to prevent shorting between these layers. A method of constructing the spin valve sensor 300 shown in FIG. 18, described next, fully explains this novel configuration.

Method of Constructing First Embodiment

Figure 19E:
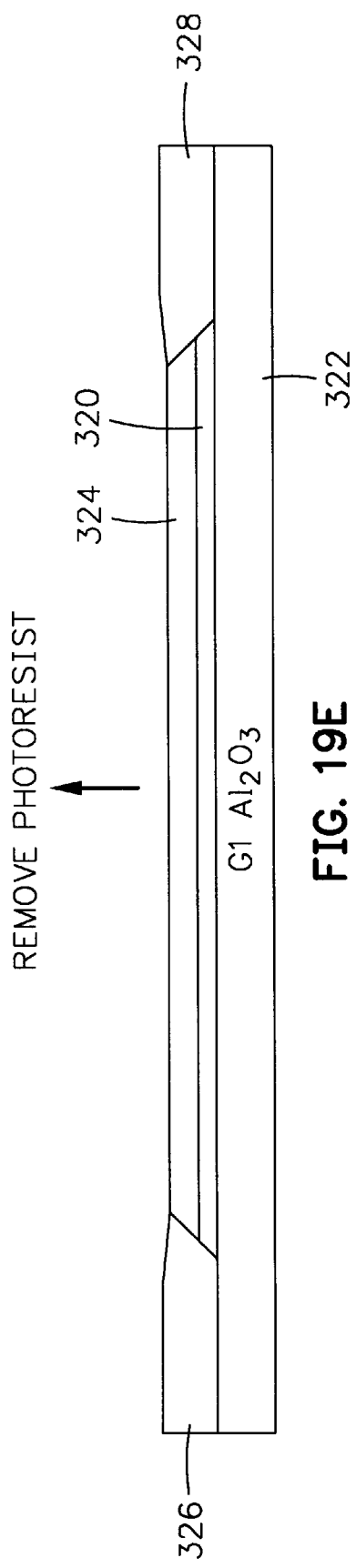
FIG. 19E is the same as FIG. 19D except the bilayer photoresist has been removed and the oxide layer formed thereon has been lifted off.
Figure 19F:
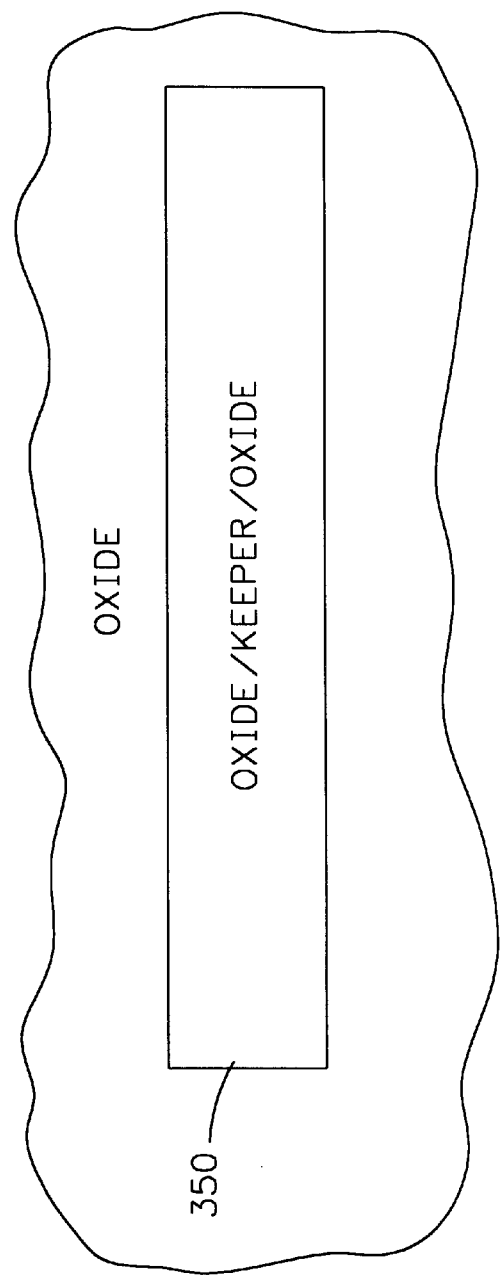
FIG. 19F is a top view of FIG. 19E.

FIGS. 19A–19L show various steps in construction of the first embodiment of the spin valve sensor with the encapsulated keeper layer shown in FIG. 18. In FIG. 19A a bottom oxide, keeper and top oxide layers 322, 320 and 324 are sputter-deposited on the bottom shield layer ($S_1$ in FIGS. 6 and 7) over an entire wafer where rows and columns of magnetic head assemblies are being constructed with a magnetic field in a transverse direction perpendicular to the ABS so as to set an easy axis of the keeper layer 320 in the same direction. In FIG. 19B a patterned bilayer photoresist 350 has been formed with a top photoresist layer 352 overhanging a bottom photoresist layer 354 so as to provide an undercut on each side. The width of the top photoresist layer 352 is wider than the designed track width of the spin valve sensor so that the keeper layer 320 and the top oxide layer 324 extend laterally beyond the track width of the spin valve sensor, as discussed hereinabove. In FIG. 19C ion milling is implemented to remove unmasked portions of the keeper and top oxide layers 320 and 324, providing the keeper layer 320 with the first and second side edges 330 and 332, as discussed hereinabove. In FIG. 19D an oxide layer is sputter-deposited to form the first and second side oxide layers 326 and 328 which make contiguous junctions with the first and second side edges 330 and 332 of the keeper layer as well as with the first and second side edges of the top oxide layer 324. In FIG. 19E the patterned bilayer photoresist 350 is removed by dissolving the bottom photoresist 354, and the oxide layer sputter-deposited on the top photoresist 352 is lifted off. FIG. 19F shows a top view after the first set of processes for patterning of the encapsulated keeper layer.

Figure 19G:
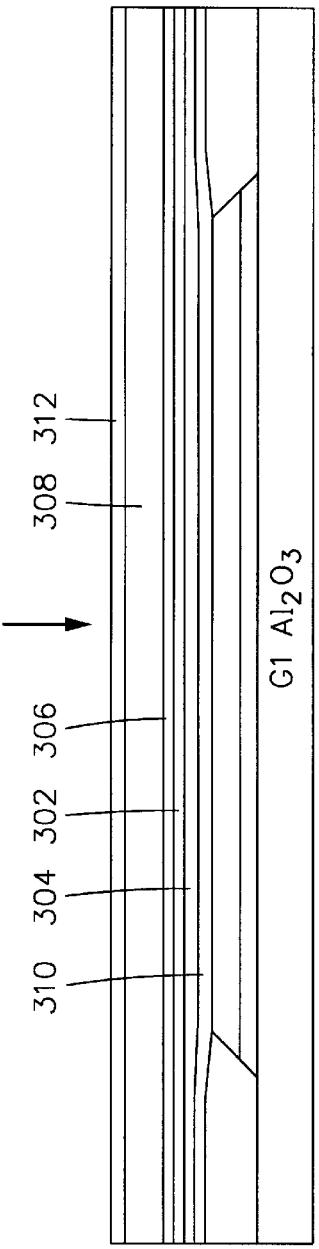
FIG. 19G is the same as FIG. 19E except spin valve layers have been formed.
Figure 19H:
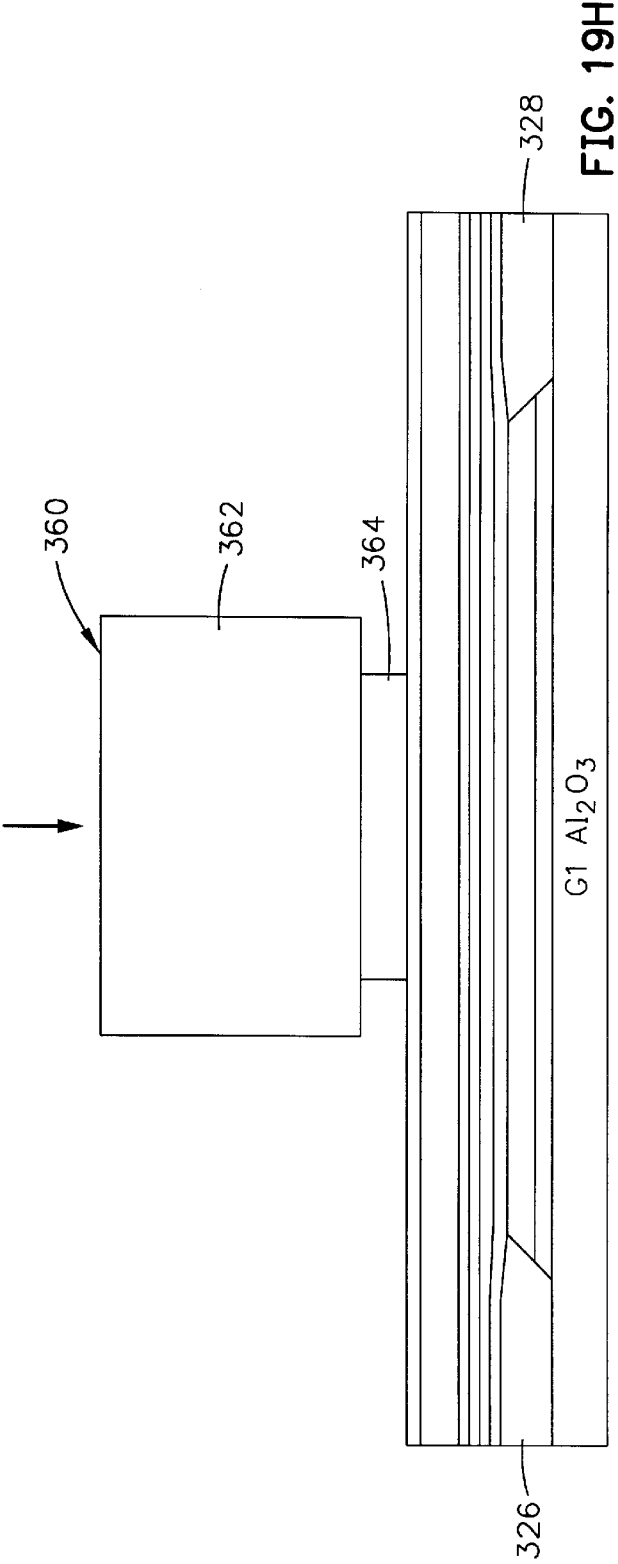
FIG. 19H is the same as FIG. 19G except a bilayer photoresist has been formed on the spin valve layers.
Figure 19I:
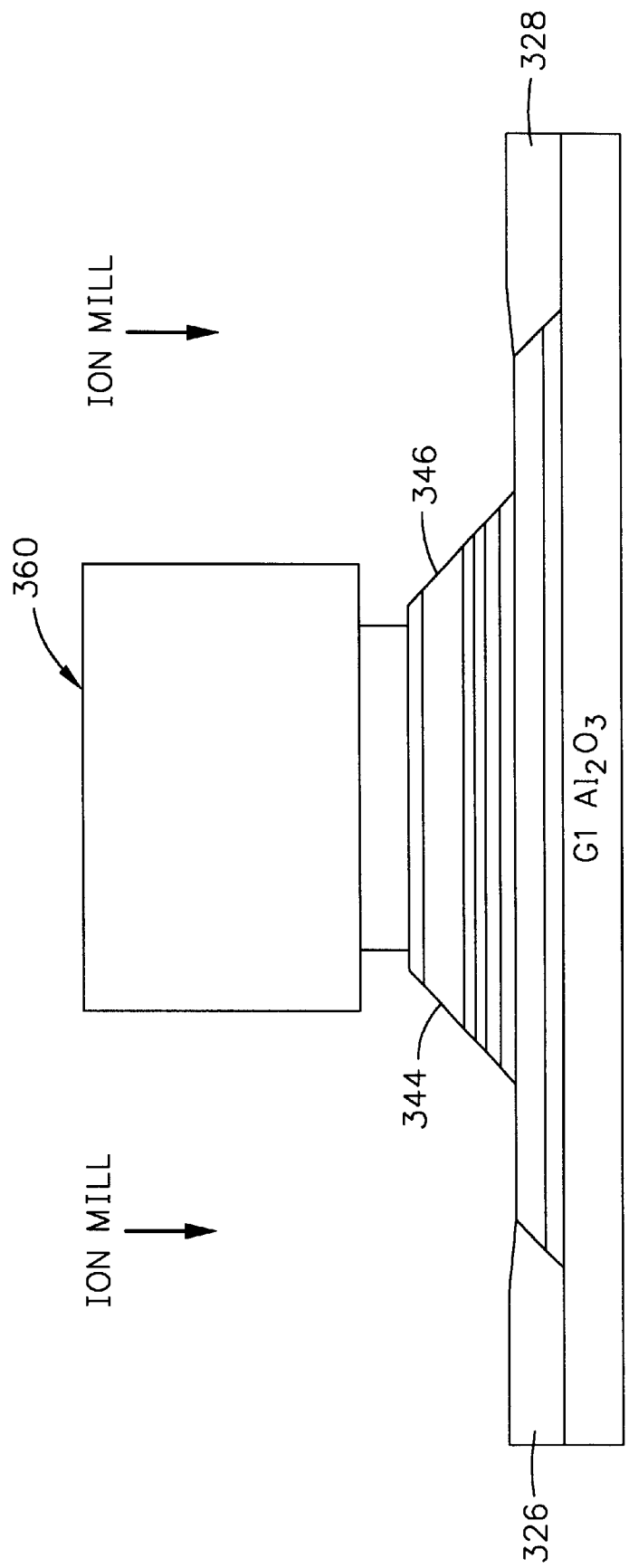
FIG. 19I is the same as FIG. 19H except ion milling has been implemented to remove portions of the spin valve sensor layers unmasked by the bilayer photoresist.
Figure 19J:
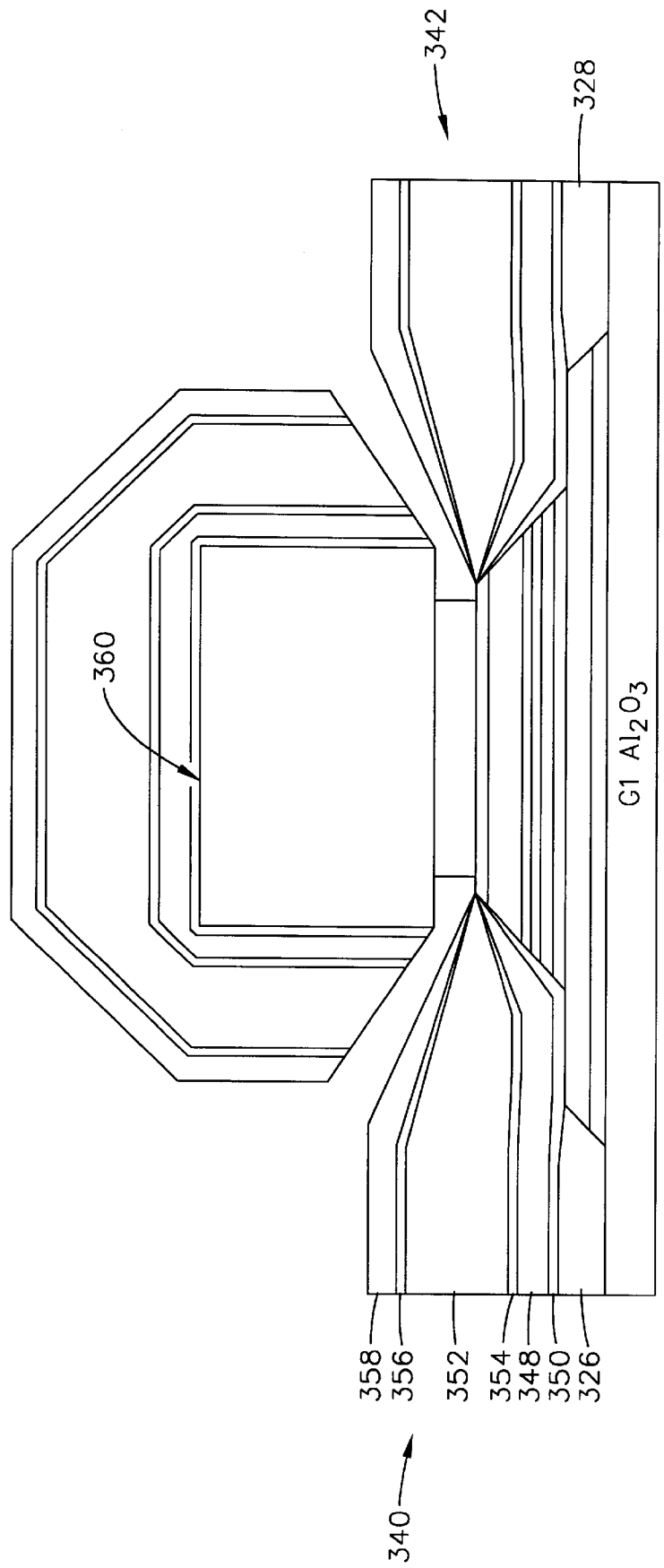
FIG. 19J is the same as FIG. 19I except hard bias and lead layers, as well as third and fourth side oxide layers have been sputter-deposited to form contiguous junctions with first and second side edges of the spin valve sensor layers.
Figure 19K:
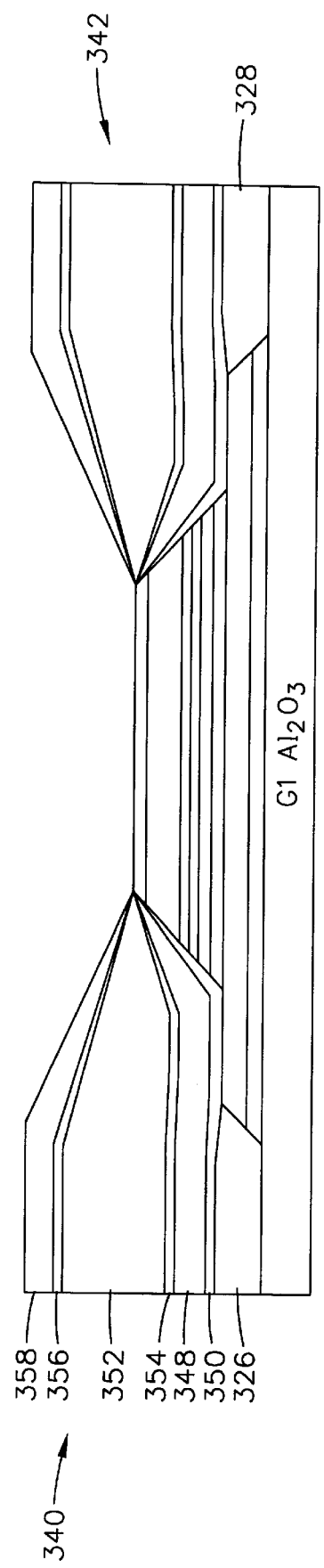
FIG. 19K is the same as FIG. 19J except the bilayer photoresist has been removed and the hard bias and lead layers, as well as third and fourth side oxide layers formed thereon have been lifted off.
Figure 19L:
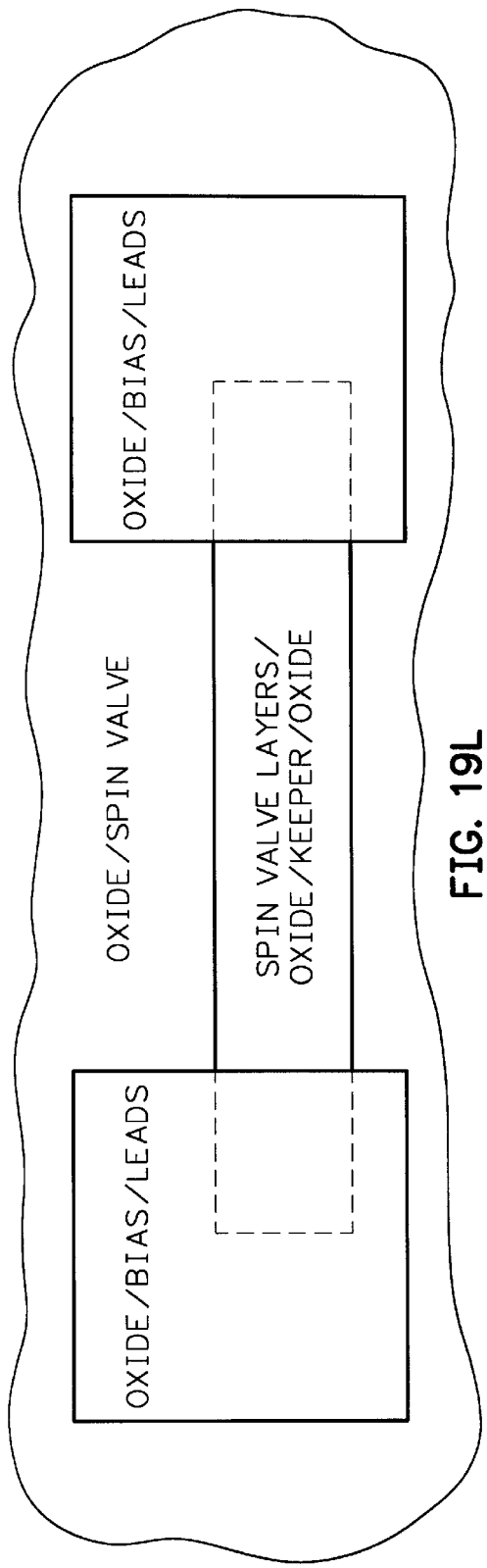
FIG. 19L is a top view of FIG. 19K.

In FIG. 19G spin valve sensor layers 310, 304, 302, 306, 308 and 312 are sputter-deposited over the entire wafer in the presence of a magnetic field (40 Oe) that is directed longitudinal to the ABS so that the sense layer 304 has an easy axis that is oriented in the same direction. The wafer is annealed at a high temperature (280° C.) with a high magnetic field (800 Oe) in a transverse direction perpendicular to the ABS in a high vacuum to develop exchange coupling between the reference and pinning layers 306 and 308. The wafer is then annealed again at a low temperature (240° C.) with a low magnetic field (40 Oe) in the longitudinal direction parallel to the ABS to bring the easy axis of the sense layer 304 to its original orientation parallel to the ABS while maintaining the magnetization of the reference layer 306 perpendicular to the ABS. In FIG. 19H a patterned bilayer photoresist 360 is formed on the spin valve sensor layers with a top photoresist layer 362 overhanging a bottom photoresist layer 364 to provide an undercut on each side. In FIG. 19I ion milling is implemented to remove unmasked portions of the spin valve sensor layers so as to form first and second side edges 344 and 346 of the spin valve sensor, as discussed hereinabove. In FIG. 19J the first and second hard bias and lead layers 340 and 342 comprising layers 350, 348, 354, 352 and 356, as well as the third and fourth side oxide layers 358 and 360 are sputter-deposited over the entire wafer. In FIG. 19K the patterned bilayer photoresist 360 is removed by dissolving the bottom photoresist 364, and the hard bias and lead layers 340 and 342, as well as the third and fourth side oxide layers 358 and 360, sputter-deposited on the top photoresist 362, are lifted off. FIG. 19L shows a top view after the second set of processes for patterning of sensor track width.

Figure 19M:
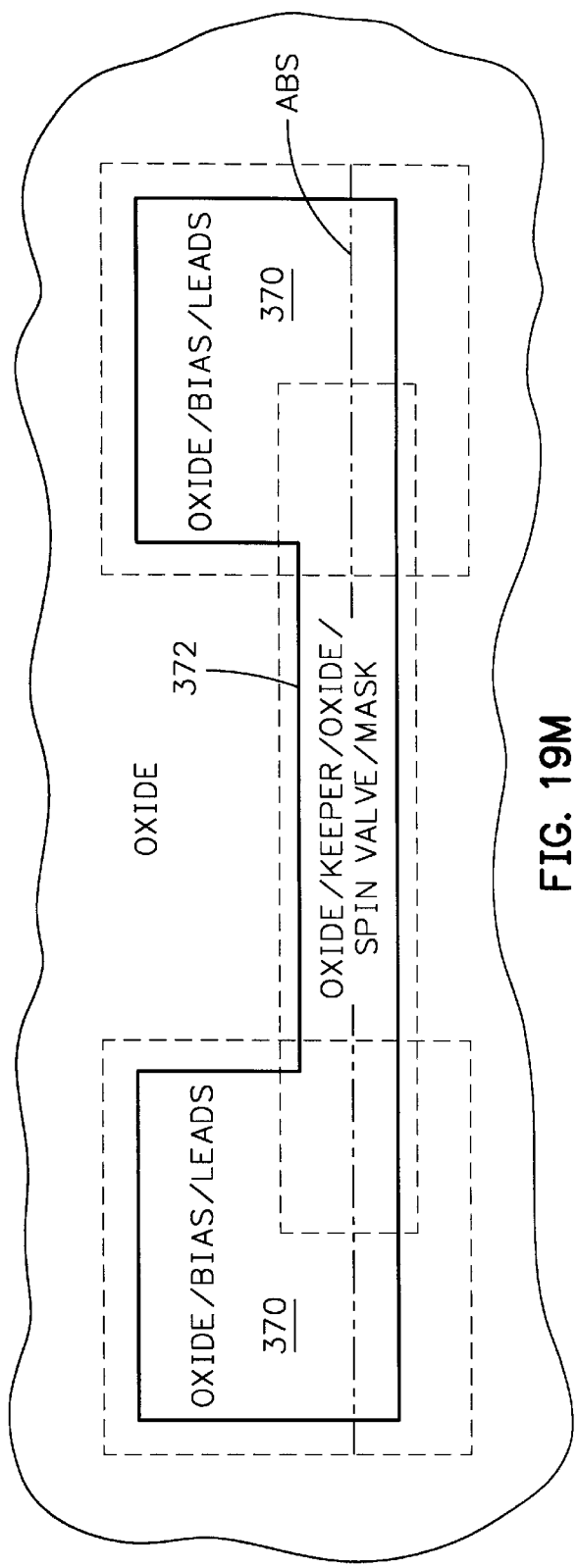
FIG. 19M is the same as FIG. 19L except another bilayer photoresist has been formed for defining a stripe height of the spin valve sensor.
Figure 19N:
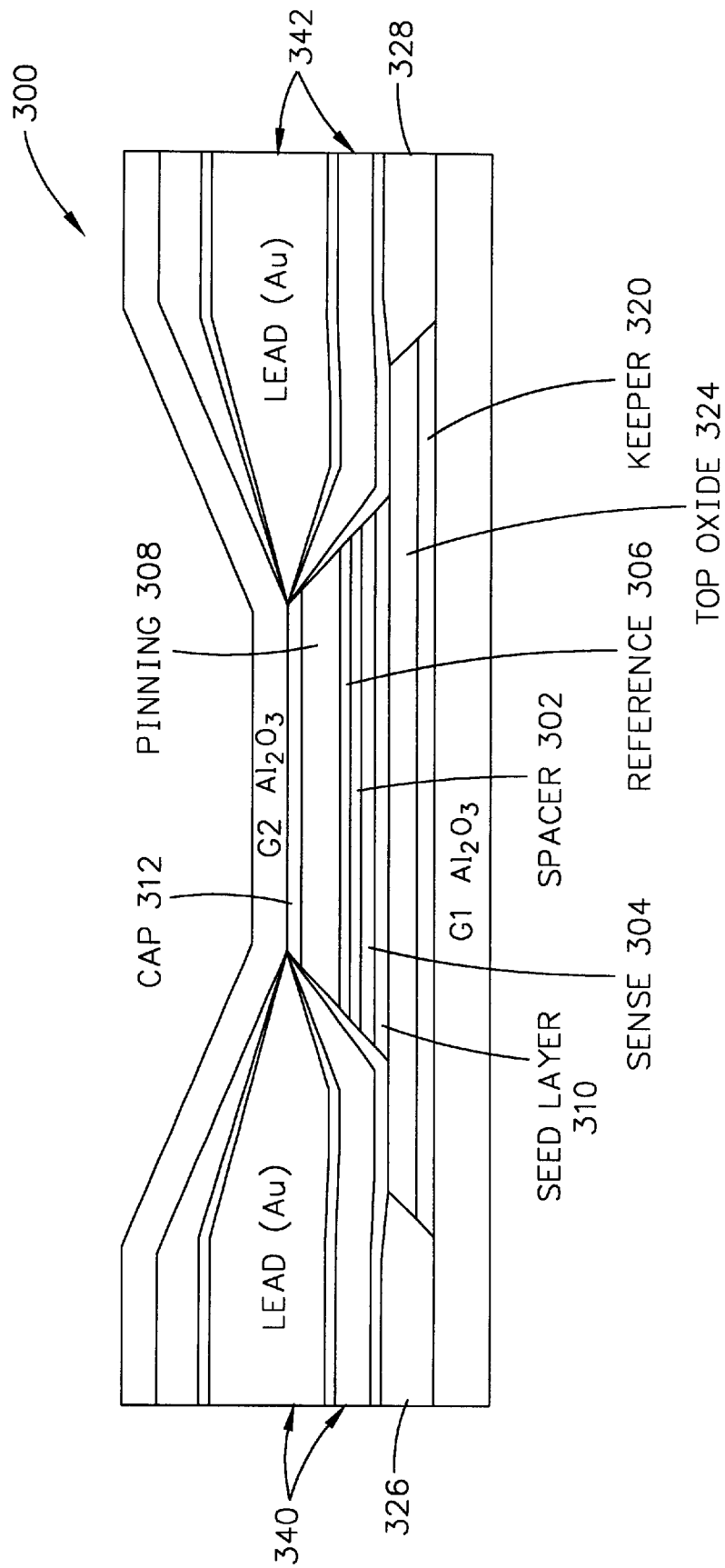
FIG. 19N is an ABS illustration of the completed spin valve sensor after the step in FIG. 19M which is the completed spin valve sensor shown in FIG. 18.

A third set of processes for patterning a sensor stripe height (distance between the ABS and recessed edge of the spin valve sensor) continues. After ion milling (not shown) to define the sensor stripe height and bilayer photoresist removal (not shown) the spin valve sensor 300 has been completed, as shown in FIGS. 19M and 19N.

The spin valve with the encapsulated keeper layer in FIG. 19N maintains the merits of both the basic and keepered spin valves, as listed in Table 2 and described below:

Demagnetizing fields in both the sense and reference layers become low and uniform, resulting in less sensitivity of readback signal asymmetry to the sensor stripe height and ease in the optimal biasing design;

The net sum of fields counteracting $H_{UA}$ becomes smaller, resulting in the alleviation of a high $H_{UA}$ requirement.

Current shunting to the encapsulated keeper layer is eliminated, resulting in no loss in readback signals;

A high GMR coefficient equivalent to that of a basic spin valve sensor with a thick reference layer can be obtained.

oven to develop exchange coupling between the Co-Fe and Ni-Mn films, and are further annealed for 1 h at 240° C. with a magnetic field of 40 Oe in the longitudinal direction to bring the easy axis of the sense layer to its original orientation while maintaining the magnetization of the Co-Fe film in the transverse direction. After the anneal, bilayer photoresist for track width definition is applied and exposed in a photolithographic tool to mask the spin valve in the read

TABLE 2

Comparison among a basic spin valve, a spin valve in electrical contact with a keeper layer, and a spin valve with an encapsulated keeper layer

| Layer | Attribute | Basic Spin Valve | Spin Valve in Electrical Contact with Keeper Layer | Spin Valve with Encapsulated Keeper Layer |
|---|---|---|---|---|
| Sense | Demagnetizing Field($H_D$) | High and Non-uniform | Low and Uniform | Low and Uniform |
|  | Sense Current-Induced Field($H_I$) | High | Low | High |
|  | Field Balance | $H_D = H_F + H_I$ | $H_I = H_F + H_D$ | $H_I = H_F + H_D$ |
| Reference | Demagnetizing Field($H'_D$) | High and Non-uniform | Low and Uniform | Low and Uniform |
|  | Sense Current-Induced Field($H'_I$) | High | High | High |
|  | Field Against $M_2$ | High($H'_D + H'_I - H_F$) | Low($H'_D - H'_I - H_F$) | Low($H'_D - H'_I - H_F$) |
| Keeper | Current Shunting | NA | Large | None |

Second Embodiment of the Invention

Figure 20:
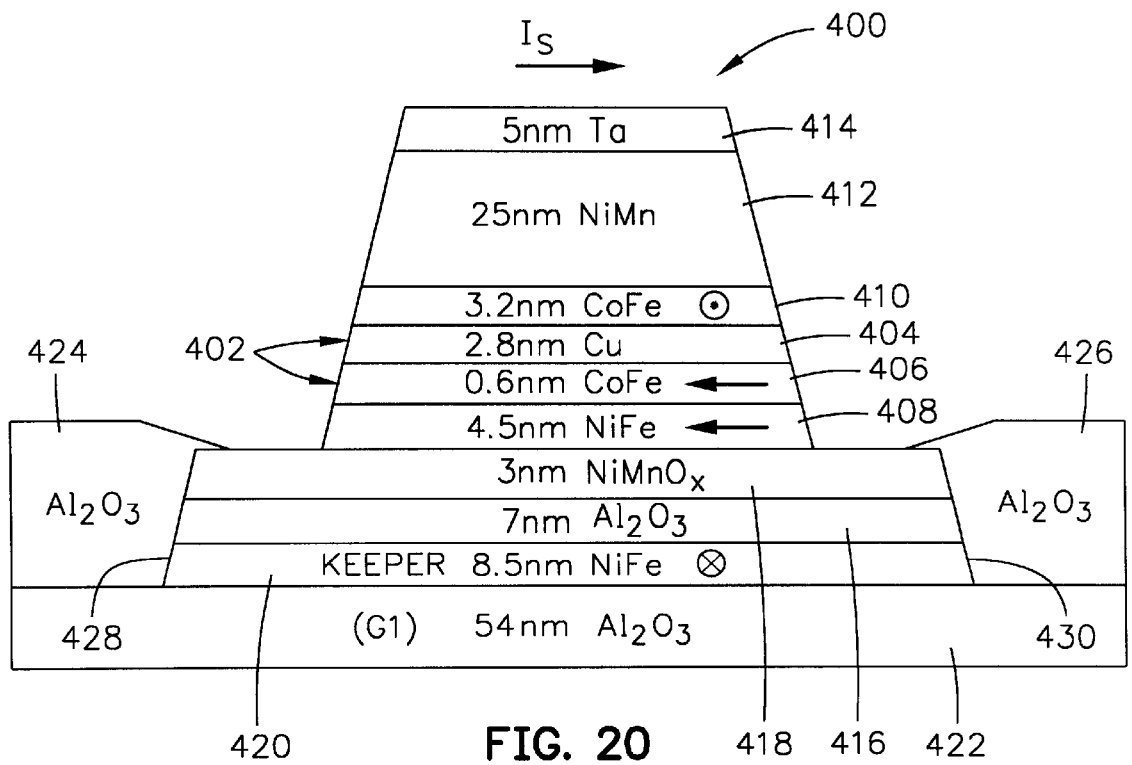
FIG. 20 is a magnified ABS illustration of a second embodiment of the present invention.

FIG. 20 illustrates a second embodiment 400 of the present spin valve sensor with an encapsulated keeper layer 420. The reference layer 410 has its magnetic moment pinned by an antiferromagnetic (AM) pinning layer 412 in a direction perpendicular and toward the ABS. A cap layer 414 may be on the pinning layer 412 for its protection. First and second top oxide layers 416 and 418 are located between a ferromagnetic keeper layer 420 and the sense layer 408. The magnetic moment of the sense layer 408 is directed longitudinal to the ABS and the magnetic moment of the keeper layer 420 is directed antiparallel to the magnetic moment of the reference layer 410. The keeper layer 420 is located on a bottom oxide layer 422 which may be on bottom read gap layer ($G_1$), and first and second side oxide layers 424 and 426 make contiguous junctions with first and second side edges 428 and 430 of the keeper layer, as well as first and second side edges of the first and second top oxide layers 416 and 418. In this embodiment the keeper layer 420 is encapsulated by oxide films which may be aluminum oxide ($Al_2O_3$). Exemplary materials for the layers and their thicknesses are shown in FIG. 20.

In the head fabrication process, the $Al_2O_3(54)$/Ni-Fe(8.5)/$Al_2O_3(7)$/NiMnO$_X$(3) films are deposited on a bottom shield film ($S_1$) over an entire wafer with a magnetic field of 40 Oe in a transverse direction perpendicular to the ABS (FIG. 19A). After the depositions, bilayer photoresist is applied and exposed in a photolithographic tool to mask a stripe region wider than a designed track width, and then developed in a solvent to form an undercut (FIG. 19B). The Ni-Fe/$Al_2O_3$/NiMnO$_X$ films in unmasked regions are removed by ion milling (FIG. 19C), an $Al_2O_3$ (20 nm) film is deposited on the unmasked regions (FIG. 19D). The bilayer photoresist is removed (FIG. 19E) and the $Al_2O_3$ film sputter-deposited on the bilayer photoresist are then lifted off. The Ni-Fe(4.5)/Co-Fe(0.6)/Cu(2.8)/Co-Fe(3.2)/Ni-Mn(25)/Ta(5) films are then sequentially deposited with a magnetic field of 40 Oe in a longitudinal direction parallel to the ABS (FIG. 19G). After the depositions, the wafer is annealed for 2 h at 280° C. with a magnetic field of 800 Oe in the transverse direction toward the ABS in a high vacuum region, and then developed in a solvent to form an undercut (FIG. 19H). The Ni-Fe/Co-Fe/Cu/Co-Fe/Ni-Mn/Ta films in unmasked regions are removed by ion milling (FIG. 19I), and hard bias layers comprising Cr(3.5)/Co-Pt-Cr(15) films and lead layers comprising Ta(5)/Au(40)/Ta(5) films are immediately deposited (FIG. 19J). The bilayer photoresist is removed and the hard bias and lead layers sputter-deposited on the bilayer photoresists are lifted off (FIG. 19K).

Third Embodiment of the Invention

Figure 21:
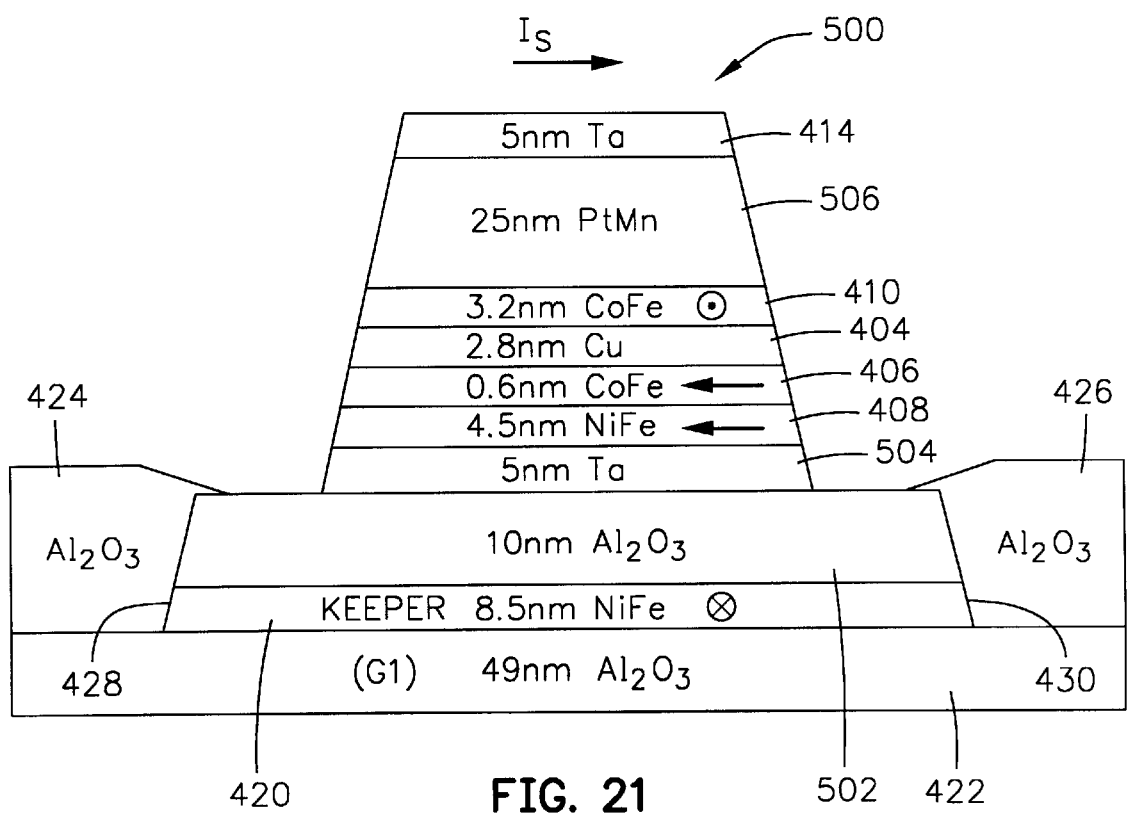
FIG. 21 is a magnified ABS illustration of a third embodiment of the present invention.

FIG. 21 illustrates a third embodiment 500 of the present invention which is the same as the embodiment 400 in FIG. 20 except a single top oxide layer 502 of aluminum oxide ($Al_2O_3$) is employed, a tantalum (Ta) layer 504 is located between the top oxide layer 502 and the sense layer 408, and the antiferromagnetic pinning layer 506 is platinum manganese (Pt-Mn) instead of nickel manganese (Ni-Mn).

In the head fabrication process, the $Al_2O_3(49)$/Ni-Fe(8.5)/$Al_2O_3(10)$ films are deposited on a bottom shield film ($S_1$) over an entire wafer with a magnetic field of 40 Oe in a transverse direction perpendicular to the ABS (FIG. 19A). After the depositions, bilayer photoresist is applied and exposed in a photolithographic tool to mask a stripe region wider than a designed track width, and then developed in a solvent to form an undercut (FIG. 19B). The Ni-Fe/$Al_2O_3$ films in unmasked regions are removed by ion milling (FIG. 19C), and an $Al_2O_3$ (20 nm) film is deposited on the unasked regions (FIG. 19D). The bilayer photoresist is then removed (FIG. 19E), and the $Al_2O_3$ film sputter-deposited on the top bilayer photoresist is then lifted off. The Ta(5)/Ni-Fe(4.5)/Co-Fe(0.6)/Cu(2.8)/Co-Fe(3.2)/Pt-Mn(25)/Ta(5) films are then sequentially deposited with a magnetic field of 40 Oe in a longitudinal direction parallel to the ABS (FIG. 19G). After the depositions, the wafer is annealed for 2 h at 280° C. with a magnetic field of 800 Oe in the transverse direction toward the ABS in a high vacuum oven to develop exchange coupling between the Co-Fe and Pt-Mn films, and are further annealed for 1 h at 240° C. with a magnetic field of 40 Oe in the longitudinal direction to bring the easy axis of the sense layer to its original orientation while maintaining the magnetization of the Co-Fe film in the transverse direction. After the anneal, bilayer photoresist for track width definition is applied and exposed in a photolithographic tool to mask the spin valve in the read region, and then developed in a solvent to form an undercut (FIG. 19H). The Ta/Ni-Fe/Co-Fe/Cu/Co-Fe/Pt-Mn/Ta in unmnasked regions are removed by ion milling (FIG. 19I), and hard bias layers comprising Cr(3.5)/Co-Pt-Cr(15) films and lead layers comprising Ta(5)/Au(40)/Ta(5) films are immediately deposited (FIG. 19J). The bilayer photoresist is then removed (FIG. 19K) and the hard bias and lead layers sputter-deposited on the bilayer photoresist are lifted off.

Figure 22:
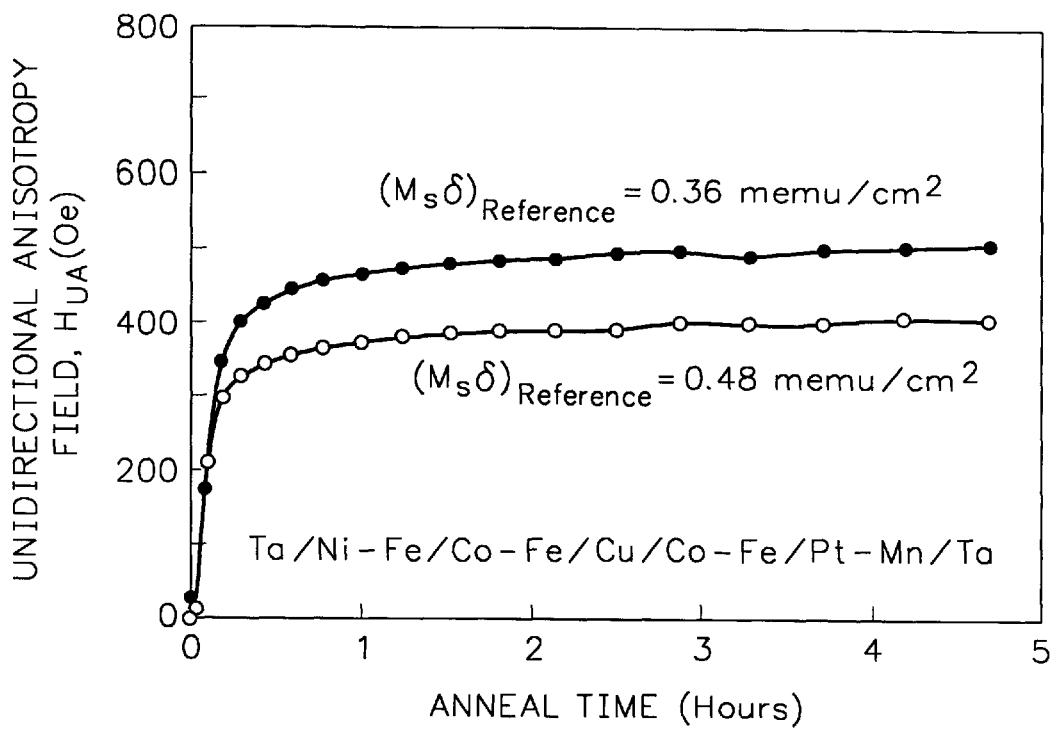
FIG. 22 is a graph illustrating unidirectional anisotropy field versus anneal time in hours for Pt-Mn basic spin valve sensors similar to the spin valve sensor shown in FIG. 21 but without the keeper layer.
Figure 23:
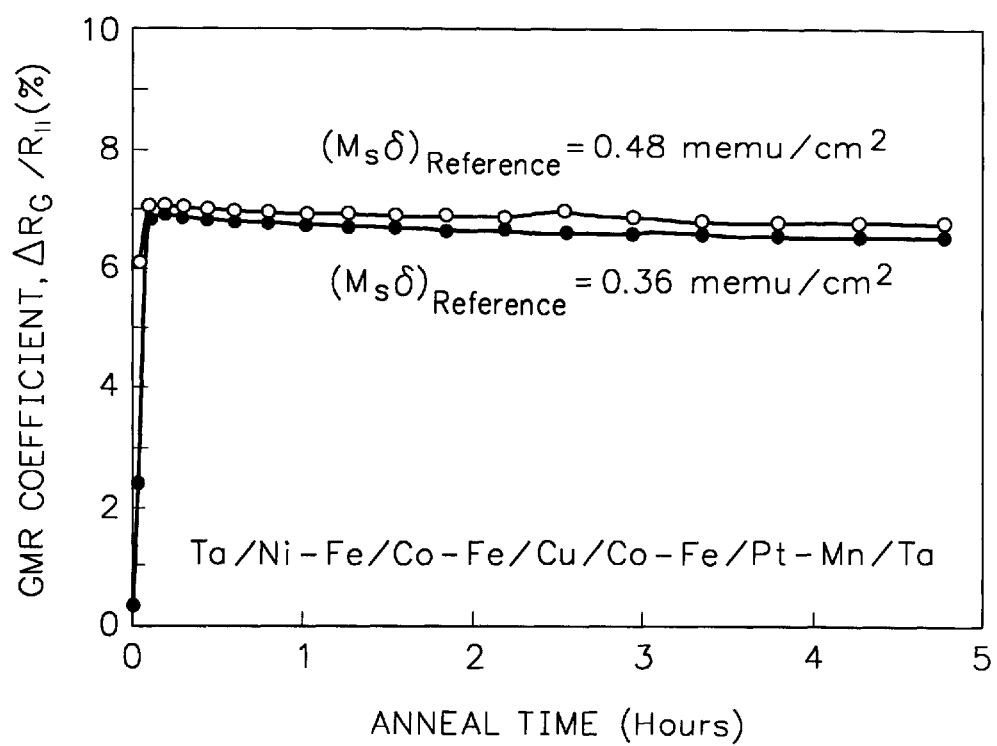
FIG. 23 is a graph illustrating GMR coefficient versus anneal time in hours for the Pt-Mn basic spin valve sensors of FIG. 22.

The GMR coefficient of the Pt-Mn spin valve with the encapsulated Ni-Fe keeper layer is basically identical to that of a basic Pt-Mn spin valve due to no current shunting into the encapsulated keeper layer. FIGS. 22 and 23 show the $H_{UA}$ and GMR coefficients of basic Pt-Mn spin valves comprising Ta(5)/Ni-Fe(4.5)/Co-Fe(0.6)/Cu(2.8)/Co-Fe/Pt-Mn(25)/Ta(5) films vs the reference layer moment. A decrease in the reference layer moment also leads to a higher $H_{UA}$ but a lower GMR coefficient. The GMR coefficient of the Pt-Mn spin valve with the encapsulated Ni-Fe keeper layer can be higher than that of the basic Pt-Mn spin valve also due to the use of a thicker Co-Fe reference layer in the keepered spin valve.

Fourth Embodiment of the Invention

The magnetization of the encapsulated Ni-Fe keeper layer described in the previous three embodiments must be oriented in a transverse direction away from the ABS (for sense current $I_S$ flowing from left to right) for proper sensor orientation. This can be achieved by applying a magnetic field in the preferred transverse direction during the deposition of the keeper layer. This orientation is ensured by the partial flux-closure resulting from magnetostatic coupling between the reference and the encapsulated keeper layers. To further ensure this orientation and to prevent the instability of the encapsulated keeper layer, the encapsulated keeper layer is preferred to be pinned through ferromagnetic/antiferromagnetic coupling or antiparallel coupling, as described in the following fourth and fifth embodiments.

Figure 24:
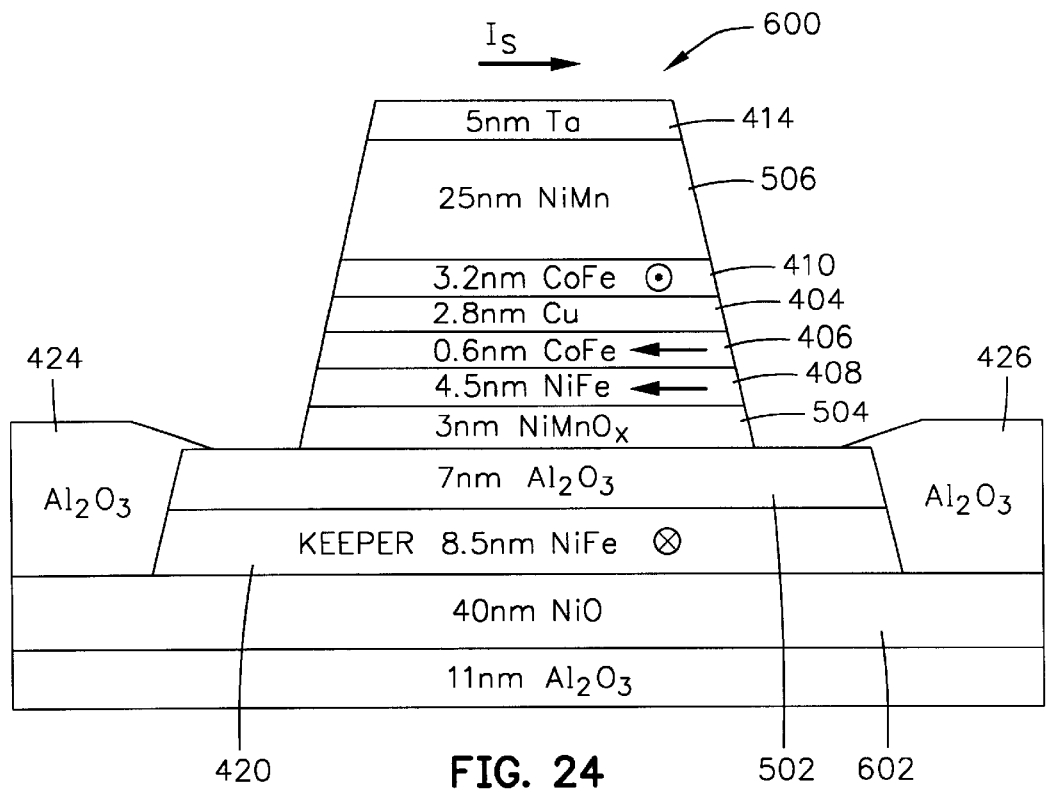
FIG. 24 is a magnified ABS illustration of a fourth embodiment of the invention.

FIG. 24 illustrates a fourth embodiment 600 of the present invention which is the same as the embodiment 300 shown in FIG. 16 except the bottom oxide layer (second antiferromagnetic film) 602 is 40 nm of antiferromagnetic nickel oxide (NiO) instead of aluminum oxide ($Al_2O_3$). The layer 602 is exchange coupled to the keeper layer 420 and is of a sufficient thickness to pin a magnetic moment of the keeper layer 420 antiparallel to the magnetic moment of the reference layer 410.

To attain partial flux closure of the reference and encapsulated keeper layers, the blocking temperature ($T_B$, a critical temperature where exchange coupling diminishes) of the Ni-Fe keeper layer 420 and the antiferromagnetic NiO film 602 must be lower than that of the reference/pinning layers (430° C. and 380° C. for the Co-Fe/Ni-Mn and Co-Fe/Pt-Mn films, respectively). The NiO film 602 is a suitable antiferromagnetic oxide layer since it exchange couples to the Ni-Fe (8.5 nm) film 420 deposited on top of it, providing an $H_{UA}$ of 50 Oe and exhibiting a blocking temperature of 200° C. In the head fabrication process, $Al_2O_3(11)$/NiO(40)/Ni-Fe(8.5)/$Al_2O_3(10)$ films are deposited on a bottom shield film ($S_1$) over an entire wafer with a magnetic field of 40 Oe in a transverse direction perpendicular to and away from the ABS (FIG. 19A). The NiO film 602 with a thickness beyond a critical value (35 nm) exchange-couples to the Ni-Fe film 420. After continuing processes as described in the preferred embodiment, the wafer is annealed for 2 h at 280° C. with a magnetic field of 800 Oe in the transverse direction toward the ABS in a high vacuum oven to develop exchange coupling between the Co-Fe and Ni-Mn films, further annealed for 1 h at 240° C. with a magnetic field of 40 Oe in the longitudinal direction to bring the easy axis of the sense layer to its original orientation while maintaining the magnetization of the Co-Fe film 410 in the transverse direction, and finally annealed for 20 min at 200° C. with a magnetic field of 100 Oe in the transverse direction away from the ABS to reset the keeper layer 420 orientation.

The first pinning layer 506 may be selected from the group comprising nickel manganese (Ni-Mn), iridium manganese (Ir-Mn) and platinum manganese (Pt-Mn) with blocking temperatures of about 430° C., 270° C. and 380° C. respectively and the second pinning layer 602 may be nickel oxide (NiO) with a blocking temperature of about 200° C.

Figure 25:
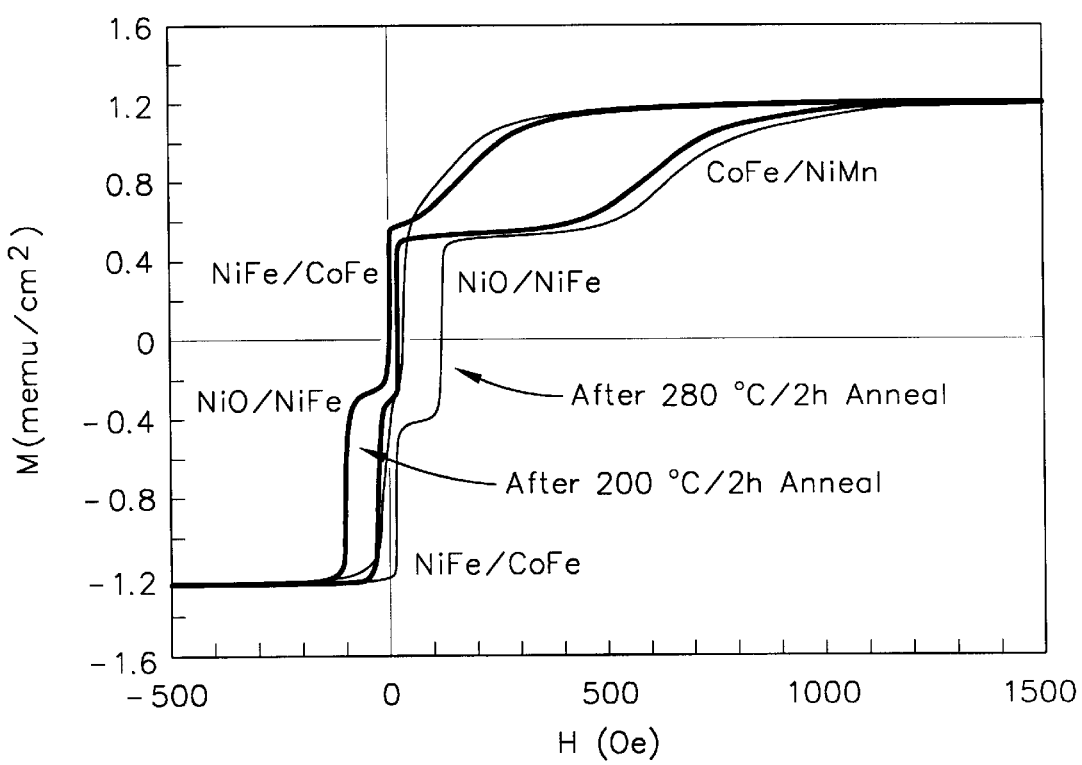
FIG. 25 is a graph of magnetoresistance responses pertaining to FIG. 24.

FIG. 25 shows magnetoresistance responses of the Ni-Mn spin valve with the encapsulated NiO/Ni-Fe layers. After the anneal for 2 h at 280° C. in the transverse direction toward the ABS, both the hysteresis loops of the Co-Fe/Ni-Mn and the NiO/Ni-Fe films are shifted on the positive-field side, indicating that both the magnetization of the reference and the encapsulated keeper layers are oriented in the same transverse direction toward the ABS. After the anneal for 20 minutes at 200° C. in the transverse direction away from the ABS, the hysteresis loop of the Co-Fe/Ni-Mn films still remains on the positive-field side due to their high blocking temperature (430° C.), while the hysteresis loop of the NiO/Ni-Fe films is completely shifted on the negative-field side, indicating both the magnetizations of the reference and the encapsulated layer are antiparallel to each other.

Fifth Embodiment of the Invention

Figure 26:
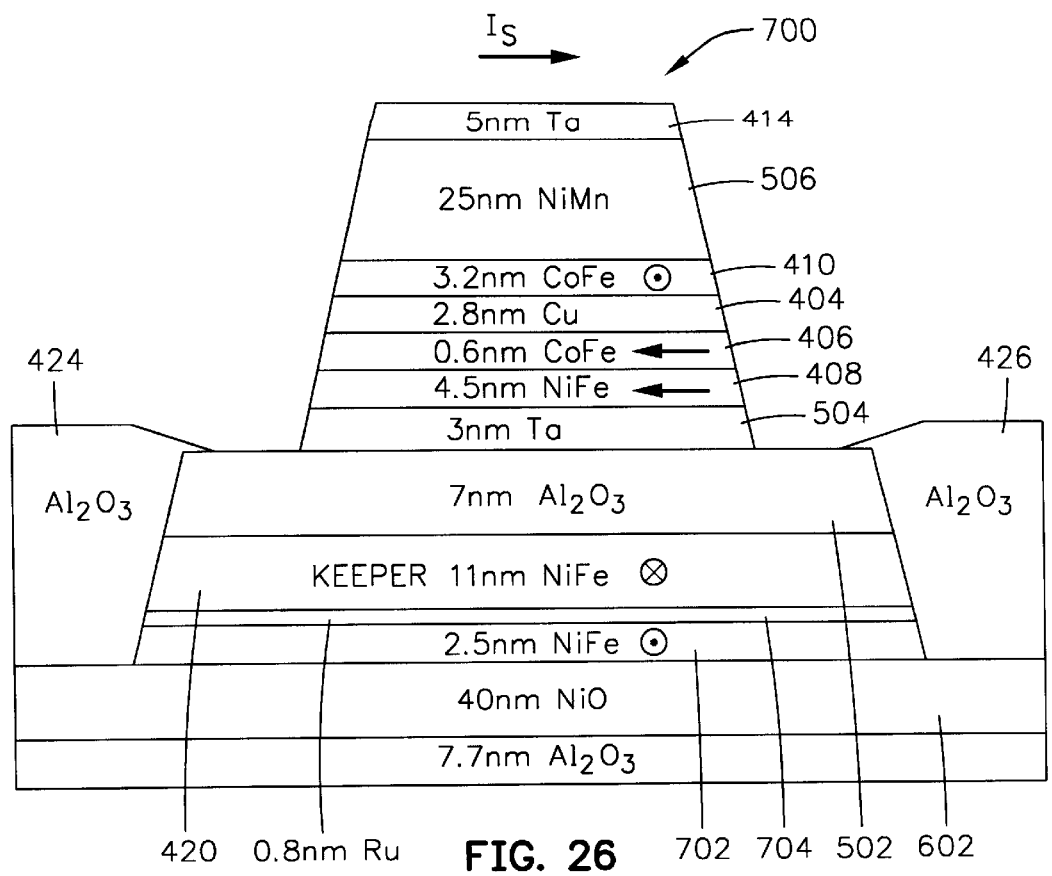
FIG. 26 is a magnified ABS illustration of a fifth embodiment of the invention.

FIG. 26 illustrates a fifth embodiment 700 of the present invention which is the same as the embodiment 300 shown in FIG. 16 except a ferromagnetic 2.5 nm of Ni-Fe film 702 is exchange coupled to the 40 nm of NiO film 602, and an antiparallel (AP) coupling layer 704 made of a 0.8 nm of ruthenium (Ru) is located between the ferromagnetic Ni-Fe film 702 and the keeper layer 420. The NiO film 602 pins the magnetic moment of the ferromagnetic Ni-Fe film 702 in a direction parallel to the magnetic moment of the reference layer 410, and by antiparallel exchange coupling across the Ru film the magnetic moment of the keeper layer 420 is pinned in a direction antiparallel to the magnetic moment of the reference layer 410. The process of making this spin valve sensor is simplified by eliminating an anneal step which is explained hereinbelow.

In the head fabrication process, $Al_2O_3(7.7)$/NiO(40)/Ni-Fe(2.5)/Ru(0.8)/Ni-Fe(8.5)/$Al_2O_3(10)$ films may be deposited on the bottom shield film ($S_1$) over an entire wafer with a magnetic field of 40 Oe in a transverse direction perpendicular to and toward the ABS (FIG. 19A). The encapsulated antiparallel-coupled trilayers may also comprise Co(1.5)/Ru (0.8)/Co(6.5) or Co-Fe(1.5)/Ru(0.8)/Co-Fe(6.5) films. After continuing processes as described in the preferred embodiment, the wafer is annealed for 2 h at 280° C. with a magnetic field of 10 kOe in the transverse direction toward the ABS in a high vacuum oven to develop exchange coupling between the Co-Fe and Ni-Mn films 410 and 506, and further annealed for 1 h at 240° C. with a magnetic field of 40 Oe in the longitudinal direction to bring the easy axis of the sense layer to its original orientation while maintaining the magnetization of the Co-Fe film 410 in the transverse direction. After the first anneal, the magnetization of the Ni-Fe film 702 in contact with the NiO film 602 is pinned in the transverse direction toward the ABS. Due to antiparallel coupling across the Ru film 704, the Ni-Fe film 420 in contact with the $Al_2O_3$ film 502 is oriented in the transverse direction away from the ABS, thereby forming the partial flux-closure with the magnetization of the Co-Fe reference layer 410. The third anneal used to reset the orientation of the magnetization of the keeper layer 420 is thus eliminated. In this embodiment the antiferromagnetic films 506 and 602 may be the same material.

Figure 27:
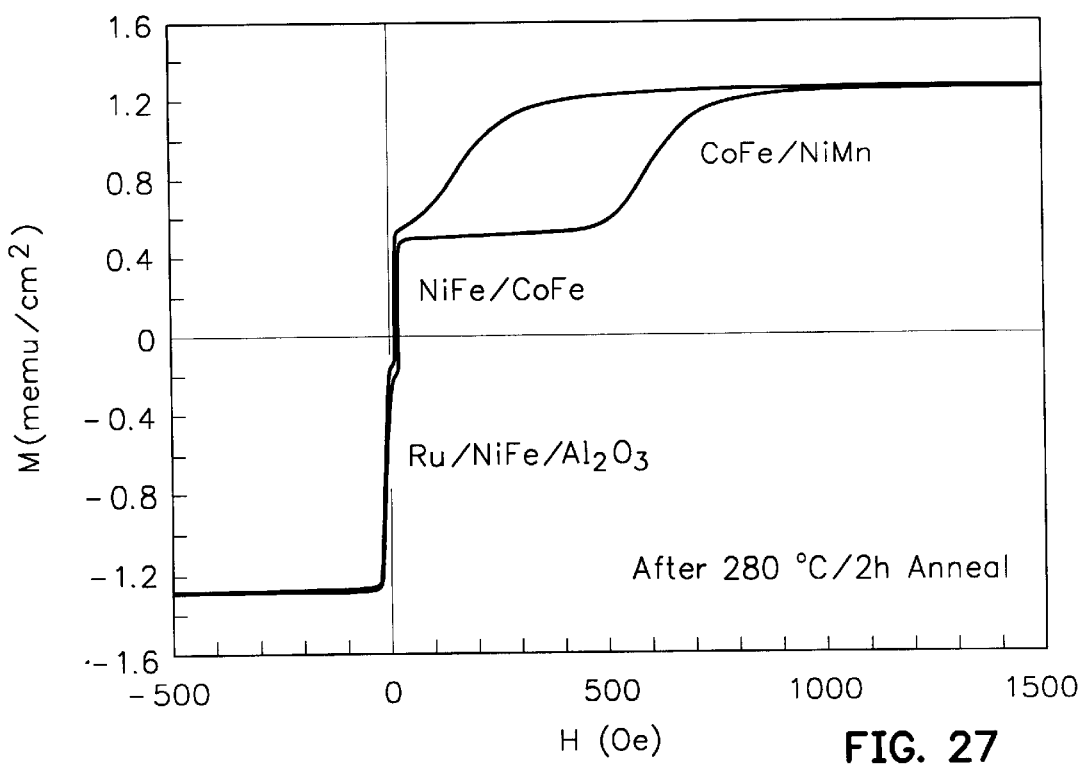
FIG. 27 is a graph of magnetoresistance responses pertaining to FIG. 26.

FIG. 27 shows magnetoresistance responses of the Ni-Mn spin valve with the encapsulated NiO/Ni-Fe/Ru/Ni-Fe layers. After only one anneal for 2 h at 280° C. in the transverse direction toward the ABS, the hysteresis loop of the Co-Fe/Ni-Mn films is shifted on the positive-field side, while the hysteresis loop of the NiFe keeper layer is shifted on the negative-field side, indicating that both the magnetizations of the reference and the encapsulated layers are antiparallel to each other. Since this antiparallel orientation relationship is attained by only one anneal, a substantial difference between two blocking temperatures is thus not required. Therefore, another antiferromagnetic film with a high blocking temperature, such as an Ir-Mn (7.5 nm) film with a blocking temperature of 270° C., Pt-Mn (25 nm) film with a blocking temperature of 380° C., or an $\alpha$-Fe$_2$O$_3$(40) film with a blocking temperature of 320° C., can be used as the second antiferromagnetic film. However, for the spin valve sensor with a very narrow read gap ($\leqq$150 nm) for the use of high density recording, an antiferromagnetic oxide, such as the NiO (40 nm) or $\alpha$-Fe$_2$O$_3$ (40 nm) film, is the first candidate, and the Ir-Mn (7.5 nm) with a very small critical thickness (6 nm) is the second candidate.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic read head that has an air bearing surface (ABS) comprising:
    nonmagnetic nonconductive top and bottom read gap layers;
    a spin valve sensor being located between the top and bottom read gap layers;
    top and bottom shield layers; and
    the top and bottom read gap layers being located between the top and bottom shield layers;
    the spin valve sensor including:
        a ferromagnetic reference layer;
        an antiferromagnetic first pinning layer exchange coupled to the reference layer for pinning a magnetic moment of the reference layer;
        a ferromagnetic sense layer having a magnetic moment;
        a nonmagnetic electrically conductive spacer layer located between the reference layer and the sense layer;
        a ferromagnetic keeper layer for providing flux closure for at least a portion of a demagnetizing field of the reference layer;
        a nonmagnetic nonconductive separation insulation layer located between the sense layer and the keeper layer; and
        each of the keeper layer and the separation insulation layer having first and second side edges that extend transverse to said ABS; and
    nonmagnetic nonconductive first and second side insulation layers; and
    a first side edge of the first side insulation layer abutting the first side edge of each of the keeper and the separation insulation layers and a first side edge of the second side insulation layer abutting the second side edge of each of the keeper and the separation insulation layers.

2. A magnetic read head as claimed in claim 1 wherein the reference layer is Co or Co-Fe, the spacer layer is Cu, the sense layer is Ni-Fe, Ni-Fe/Co or Ni-Fe/Co-Fe, the seed layer is nickel manganese oxide (NiMnO$_x$), the separation insulation layer is alumina oxide (Al$_2$O$_3$), and the keeper layer is Ni-Fe, Ni-Fe-Cr or Ni-Fe-Rh.

3. A magnetic read head as claimed in claim 1 including:
    each of the reference layer, the spacer layer and the sense layer having first and second side edges that are transverse to the ABS;
    first and second hard bias layers on the first and second side insulation layers respectively and magnetostatically interacted with the first and second side edges respectively of the reference layer and the sense layer; and
    electrically conductive first and second lead layers on the first and second hard bias layers respectively and electrically connected to the first and second side edges respectively of the reference layer, the spacer layer and the sense layer.

4. A magnetic read head as claimed in claim 1 wherein the spin valve sensor further includes:
    an antiferromagnetic second pinning layer exchange coupled to the keeper layer for pinning a magnetic moment of the keeper layer in a second direction antiparallel to said first direction of the magnetic moment of the reference layer;
    the first pinning layer having a higher blocking temperature than a blocking temperature of the second pinning layer.

5. A magnetic read head as claimed in claim 4 including:
    the sense layer having a width at the ABS that defines a track width of the read head; and
    each of the keeper layer and the separation insulation layer having a width at the ABS that is greater than said track width.

6. A magnetic read head as claimed in claim 5 wherein the first pinning layer is selected from a group comprising nickel manganese (Ni-Mn), iridium manganese (Ir-Mn) and platinum manganese (Pt-Mn) and the second pinning layer is nickel oxide (NiO).

7. A magnetic read head as claimed in claim 1 wherein the separation insulation layer is aluminum oxide (Al$_2$O$_3$) or nickel manganese oxide (NiMnO$_x$).

8. A magnetic read head as claimed in claim 1 wherein the spin valve sensor further includes:
    a ferromagnetic antiparallel (AP) coupled layer;
    an antiferromagnetic second pinning layer exchange coupled to the AP coupled layer for pinning a magnetic moment of the AP coupled layer in a second direction that is parallel to said first direction;
    an antiparallel (AP) coupling layer located between the keeper layer and the AP coupled layer so that a magnetic moment of the keeper layer is AP coupled through the AP coupling layer in a third direction that is antiparallel to said first and second directions;
    each of the AP pinned layer and the AP coupling layer having first and second side edges; and
    the first side insulation layer abutting the first side edge of each of the AP coupled layer and the AP coupling layer, the keeper layer and the separation insulation layer and the second side insulation layer abutting the second side edge of each of the AP coupled layer, the AP coupling layer, the keeper layer and the separation insulation layer.

9. A magnetic read head as claimed in claim 8 including:

the sense layer having a width at the ABS that defines a track width of the read head; and each of the AP coupled layer, the AP coupling layer, the keeper layer and the separation insulation layer having a width at the ABS that is greater than said track width.

10. A magnetic read head as claimed in claim 9 wherein the second pinning layer is nickel oxide (NiO) or alpha iron oxide ($\alpha$-$Fe_2O_3$), the AP coupled layer is Ni-Fe, Co or Co-Fe, the AP coupling layer is Ru, and the keeper layer is Ni-Fe or Co-Fe.

11. A magnetic head assembly including a read head and a write head and an ABS comprising:

the write head including:
ferromagnetic top and bottom pole piece layers;
each of the top and bottom pole piece layers having a yoke portion located between a pole tip portion and a back gap portion;
a nonmagnetic write gap layer located between the pole tip portions of the top and bottom pole piece layers;
an insulation stack with at least one coil layer embedded therein located between the yoke portions of the top and bottom pole piece layers; and
the top and bottom pole piece layers being connected at their back gap portions; and the read head including:
a read sensor having first and second side edges;
first and second hard bias and lead layer structures connected to the first and second side edges of the read sensor;
nonmagnetic nonconductive top and bottom read gap layers;
the read sensor and the first and second hard bias and lead layers being located between the top and bottom read gap layers;
a ferromagnetic bottom shield layer; and
the top and bottom read gap layers being located between the bottom shield layers and the first pole piece layer; and the read sensor including:
a ferromagnetic reference layer and an antiferromagnetic first pinning layer, the first pinning layer being exchange coupled to the reference layer for pinning a magnetic moment of the reference layer in a first direction;
a nonmagnetic electrically conductive spacer layer and a ferromagnetic sense layer, the sense layer having a magnetic moment that is free to rotate in response to signal fields;
the spacer layer being located between the reference layer and the sense layer;
a ferromagnetic keeper layer for providing flux closure for at least a portion of a demagnetizing field of the reference layer;
a nonmagnetic nonconductive separation insulation layer located between the sense layer and the keeper layer; and each of the keeper layer and the separation insulation layer having first and second side edges that extend transverse to said ABS; and nonmagnetic nonconductive first and second side insulation layers; and the first side edge of the first side insulation layer abutting the first side edge of each of the keeper and separation insulation layers and the first side edge of the second side insulation layer abutting the second side edge of each of the keeper and separation insulation layers.

12. A magnetic head assembly as claimed in claim 11 including:

the read head further including:
a ferromagnetic top shield layer;
a nonmagnetic nonconductive separation layer; and
the separation layer being located between the top shield layer the bottom pole piece layer.

13. A magnetic head assembly as claimed in claim 11 wherein the spin valve sensor further includes:

an antiferromagnetic second pinning layer exchange coupled to the keeper layer for pinning a magnetic moment of the keeper layer in a second direction antiparallel to said first direction of the magnetic moment of the reference layer;

the first pinning layer having a higher blocking temperature than a blocking temperature of the second pinning layer.

14. A magnetic head assembly as claimed in claim 13 including:

the sense layer having a width at the ABS that defines a track width of the read head; and each of the keeper layer and the separation insulation layer having a width at the ABS that is greater than said track width.

15. A magnetic head assembly as claimed in claim 14 wherein the first pinning layer is selected from a group comprising nickel manganese (Ni-Mn), iridium manganese (Ir-Mn) and platinum manganese (Pt-Mn) and the second pinning layer is nickel oxide (NiO).

16. A magnetic head assembly as claimed in claim 15 including:

each of the reference layer, the spacer layer and the sense layer having first and second side edges that are transverse to the ABS;

first and second hard bias layers on the first and second side insulation layers respectively and magnetostatically interacted with the first and second side edges respectively of the reference layer and the sense layer; and electrically conductive first and second lead layers on the first and second hard bias layers respectively and electrically connected to the first and second side edges respectively of the reference layer, the spacer layer and the sense layer.

17. A magnetic head assembly as claimed in claim 11 wherein the spin valve sensor further includes:

a ferromagnetic antiparallel (AP) coupled layer;

an antiferromagnetic second pinning layer exchange coupled to the AP coupled layer for pinning a magnetic moment of the AP coupled layer in a second direction that is parallel to said first direction;

an antiparallel (AP) coupling layer located between the keeper layer and the AP coupled layer so that a magnetic moment of the keeper layer is AP coupled through the AP coupling layer in a third direction that is antiparallel to said first and second directions;

each of the AP pinned layer and the AP coupling layer having first and second side edges; and the first side insulation layer abutting the first side edge of each of the AP coupled layer, the AP coupling layer, the keeper layer and the separation insulation layer and the second side insulation layer abutting the second side edge of each of the AP coupled layer, the AP coupling layer, the keeper layer and the separation insulation layer.

18. A magnetic head assembly as claimed in claim 17 including:
   the sense layer having a width at the ABS that defines a track width of the read head; and
   each of the AP coupled layer, the AP coupling layer, the keeper layer and the separation insulation layer having a width at the ABS that is greater than said track width.

19. A magnetic head assembly as claimed in claim 18 including:
   each of the reference layer, the spacer layer and the sense layer having first and second side edges that are transverse to the ABS;
   first and second hard bias layers on the first and second side insulation layers respectively and magnetostatically interacted with the first and second side edges respectively of the reference layer and the sense layer; and
   electrically conductive first and second lead layers on the first and second hard bias layers respectively and electrically connected to the first and second side edges respectively of the reference layer, the spacer layer and the sense layer.

20. A magnetic disk drive having at least one slider that has an air bearing surface (ABS), the slider supporting at least one magnetic head assembly that includes a read head and a write head, the disk drive comprising:
   the write head including:
      top and bottom pole piece layers;
      each of the top and bottom pole piece layers having a yoke portion located between a pole tip portion and a back gap portion;
      a nonmagnetic write gap layer located between the pole tip portions of the top and bottom pole piece layers;
      an insulation stack with at least one coil layer embedded therein located between the yoke portions of the first and second pole piece layers; and
      the top and bottom pole piece layers being connected at their back gap portions; and
   the read head including:
      a read sensor having first and second side edges;
      first and second hard bias and lead layer structures abutting the first and second side edges of the read sensor;
      nonmagnetic nonconductive top and bottom read gap layers;
      the read sensor and the first and second hard bias and lead layers being located between the top and bottom read gap layers;
      a ferromagnetic bottom shield layer; and
      the top and bottom read gap layers being located between the bottom shield layer and the bottom pole piece layer; and
   the sensor including:
      a ferromagnetic reference layer and an antiferromagnetic first pinning layer, the first pinning layer being exchange coupled to the reference layer for pinning a magnetic moment of the reference layer in a first direction;
      a nonmagnetic electrically conductive spacer layer and a ferromagnetic sense layer, the sense layer having a magnetic moment that is free to rotate; and
      the spacer layer being located between the reference layer and the sense layer;
      a ferromagnetic keeper layer for providing flux closure for at least a portion of a demagnetizing field from the reference layer;
      a nonmagnetic nonconductive separation insulation layer located between the sense layer and the keeper layer; and
      each of the keeper layer and the separation insulation layer having first and second side edges that extend transverse to said ABS; and
   the read head including:
      nonmagnetic nonconductive first and second side insulation layers; and
      the first side edge of the first side insulation layer abutting the first side edge of each of the keeper and separation insulation layers and the first side edge of the second side insulation layer abutting the second side edge of each of the keeper and separation insulation layers;
   a housing;
   a magnetic disk rotatably supported in the housing;
   a support mounted in the housing for supporting the magnetic head assembly with its ABS facing the magnetic disk so that the magnetic head assembly is in a transducing relationship with the magnetic disk;
   a spindle motor for rotating the magnetic disk;
   an actuator connected to the support for moving the magnetic head assembly to multiple positions with respect to said magnetic disk; and
   a processor means connected to the magnetic head assembly, to the spindle motor and to the actuator for exchanging signals with the magnetic head assembly, for controlling movement of the magnetic disk and for controlling the position of the magnetic head assembly.

21. A magnetic disk drive as claimed in claim 20 including:
   the read head further including:
      a ferromagnetic top shield layer;
      a nonmagnetic nonconductive separation layer; and
      the separation layer being located between the top shield layer and the bottom pole piece layer.

22. A magnetic disk drive as claimed in claim 20 wherein the spin valve sensor further includes:
   an antiferromagnetic second pinning layer exchange coupled to the keeper layer for pinning a magnetic moment of the keeper layer in a second direction antiparallel to said first direction of the magnetic moment of the reference layer;
   the first pinning layer having a higher blocking temperature than a blocking temperature of the second pinning layer.

23. A magnetic disk drive as claimed in claim 22 including:
   the sense layer having a width at the ABS that defines a track width of the read head; and
   each of the keeper layer and the separation insulation layer having a width at the ABS that is greater than said track width.

24. A magnetic disk drive as claimed in claim 23 wherein the first pinning layer is selected from a group comprising nickel manganese (Ni-Mn), iridium manganese (Ir-Mn) and platinum manganese (Pt-Mn) and the second pinning layer is nickel oxide (NiO).

25. A magnetic disk drive as claimed in claim 24 including:

each of the reference layer, the spacer layer and the sense layer having first and second side edges that are transverse to the ABS;

first and second hard bias layers on the first and second side insulation layers respectively and magnetostatically interacted with the first and second side edges respectively of the reference layer, the spacer layer and the sense layer; and electrically conductive first and second lead layers on the first and second hard bias layers respectively and electrically connected to the first and second side edges respectively of the reference layer, the spacer layer and the sense layer.

26. A magnetic disk drive as claimed in claim 20 wherein the spin valve sensor further includes:

a ferromagnetic antiparallel (AP) coupled layer;

an antiferromagnetic second pinning layer exchange coupled to the AP coupled layer for pinning a magnetic moment of the AP coupled layer in a second direction that is parallel to said first direction;

an antiparallel (AP) coupling layer located between the keeper layer and the AP coupled layer so that a magnetic moment of the keeper layer is AP coupled through the AP coupling layer in a third direction that is antiparallel to said first and second directions;

each of the AP pinned layer and the AP coupling layer having first and second side edges; and the first side insulation layer abutting the first side edge of each of the AP 14 coupled layer, the AP coupling layer, the keeper layer and the separation insulation layer and the second side insulation layer abutting the second side edge of each of the AP coupled layer, the AP coupling layer, the keeper layer and the separation insulation layer.

27. A magnetic disk drive as claimed in claim 26 including:

the sense layer having a width at the ABS that defines a track width of the read head; and each of the AP coupled layer, the AP coupling layer, the keeper layer and the separation insulation layer having a width at the ABS that is greater than said track width.

28. A magnetic disk drive as claimed in claim 27 including:

each of the reference layer, the spacer layer and the sense layer having first and second side edges that are transverse to the ABS;

first and second hard bias layers on the first and second side insulation layers respectively and magnetostatically interacted with the first and second side edges respectively of the reference layer and the sense layer; and electrically conductive first and second lead layers on the first and second hard bias layers respectively and electrically connected to the first and second side edges respectively of the reference layer, the spacer layer and the sense layer.

29. A method of making a magnetic read head that has an air bearing surface (ABS) comprising the steps of:

forming nonmagnetic nonconductive top and bottom read gap layers;

forming a spin valve sensor between the top and bottom read gap layers;

forming top and bottom shield layers; and forming the top and bottom read gap layers between the top and bottom shield layers;

a making the spin valve sensor comprising the steps of:

forming a ferromagnetic reference layer and an antiferromagnetic first pinning layer with the first pinning layer being exchange coupled to the reference layer for pinning a magnetic moment of the reference layer in a first direction;

forming a nonmagnetic electrically conductive spacer layer and a ferromagnetic sense layer with the spacer layer being located between the reference layer and the sense layer and with the sense layer having a magnetic moment;

forming a ferromagnetic keeper layer for providing flux closure for at least a portion of a demagnetizing field from the reference layer;

forming a nonmagnetic nonconductive separation insulation layer between the sense layer and the keeper layer; and forming each of the keeper layer and the separation insulation layer with first and second side edges that extend transverse to said ABS; and forming nonmagnetic nonconductive first and second side insulation layers with the first side edge of the first side insulation layer abutting the first side edge of each of the keeper and separation insulation layers and the first side edge of the second side insulation layer abutting the second side edge of each of the keeper and separation insulation layers.

30. A method as claimed in claim 29 wherein the reference layer is Co or Co-Fe, the spacer layer is Cu, the sense layer is Ni-Fe, Ni-Fe/Co or Ni-Fe/Co-Fe, the seed layer is nickel manganese oxide (NiMnO$_x$), the separation insulation layer is alumina oxide (Al$_2$O$_3$), and the keeper layer is Ni-Fe, Ni-Fe-Cr or Ni-Fe-Rh.

31. A method as claimed in claim 29 including:

forming each of the reference layer, the spacer layer and the sense layer with first and second side edges that are transverse to the ABS;

forming first and second hard bias layers on the first and second side insulation layers respectively magnetostatically interacted with the first and second side edges respectively of the reference layer and the sense layer; and forming conductive first and second lead layers on the first and second hard bias layers respectively and electrically connected to the first and second side edges respectively of the reference layer, the spacer layer and the sense layer.

32. A method as claimed in claim 29 wherein a making of the spin valve sensor further comprises the steps of:

forming an antiferromagnetic second pinning layer exchange coupled to the keeper layer for pinning a magnetic moment of the keeper layer in a second direction antiparallel to said first direction of the magnetic moment of the reference layer; and forming the first pinning layer with a higher blocking temperature than a blocking temperature of the second pinning layer.

33. A method as claimed in claim 32 wherein the first pinning layer is formed from a group comprising nickel manganese (Ni-Mn), iridium manganese (Ir-Mn) and platinum manganese (Pt-Mn) and the second pinning layer is nickel oxide (NiO).

34. A method as claimed in claim 32 including:

forming the sense layer with a width at the ABS that defines a track width of the read head; and forming each of the keeper layer and the separation insulation layer with a width at the ABS that is greater than said track width.

35. A method as claimed in claim 34 wherein the first pinning layer is formed from a group comprising nickel manganese (Ni-Mn), iridium manganese (Ir-Mn) and platinum manganese (Pt-Mn) and the second pinning layer is nickel oxide (NiO).

36. A method as claimed in claim 29 wherein a making of the spin valve sensor further includes the steps of:
   forming a ferromagnetic antiparallel (AP) coupled layer;
   forming an antiferromagnetic second pinning layer exchange coupled to the AP coupled layer for pinning a magnetic moment of the AP coupled layer in a second direction that is parallel to said first direction;
   forming an antiparallel (AP) coupling layer between the keeper layer and the AP coupled layer so that a magnetic moment of the keeper layer is antiparallel coupled through the AP coupling layer in a third direction that is antiparallel to said first and second directions;
   forming each of the AP pinned layer and the AP coupling layer with first and second side edges; and
   forming the first side insulation layer abutting the first side edge of each of the AP coupled layer, the AP coupling layer, the keeper layer and the separation insulation layer and the second side insulation layer abutting the second side edge of each of the AP coupled layer, the AP coupling layer, the keeper layer and the separation insulation layer.

37. A method as claimed in claim 36 including:
   forming the sense layer with a width at the ABS that defines a track width of the read head; and
   forming each of the AP coupled layer, the AP coupling layer, the keeper layer and the separation insulation layer with a width at the ABS that is greater than said track width.

38. A method of making a magnetic head assembly having a read head and a write head comprising the steps of:
   a forming of the write head comprising the steps of:
   forming ferromagnetic top and bottom pole piece layers with a yoke portion between a pole tip portion and a back gap portion;
   forming a nonmagnetic write gap layer between the pole tip portions of the top and bottom pole piece layers;
   forming an insulation stack with at least one coil layer embedded therein in the yoke portions of the top and bottom pole piece layers; and
   connecting the top and bottom pole piece layers at their back gaps portions; and
   a forming of the read head comprising the steps of:
   forming nonmagnetic nonconductive top and bottom read gap layers;
   forming a spin valve sensor between the top and bottom read gap layers;
   forming a ferromagnetic bottom shield layer; and
   forming the top and bottom read gap layers between the bottom shield layer and the bottom pole piece layer; and
   a making of the spin valve sensor comprising the steps of:
   forming a ferromagnetic reference layer and an antiferromagnetic first pinning layer with the first pinning layer being exchange coupled to the reference layer for pinning a magnetic moment of the reference layer in a first direction;
   forming a nonmagnetic electrically conductive spacer layer and a ferromagnetic sense layer with the spacer layer being located between the reference layer and the sense layer and with the sense layer having a magnetic moment;
   forming a ferromagnetic keeper layer for providing flux closure for at least a portion of a demagnetizing field from the reference layer;
   forming a nonmagnetic nonconductive separation insulation layer between the sense layer and the keeper layer; and
   forming each of the keeper layer and the separation insulation layer with first and second side edges that extend transverse to said ABS; and
   forming nonmagnetic nonconductive first and second side insulation layers with the first side edge of the first side insulation layer abutting the first side edge of each of the keeper and separation insulation layers and the first side edge of the second side insulation layer abutting the second side edge of each of the keeper and separation insulation layers.

39. A method as claimed in claim 38 further comprising the steps of:
   forming a ferromagnetic top shield layer between the top read gap layer and the bottom pole piece layer; and
   forming a nonmagnetic separation layer between the top shield layer and the bottom pole piece layer.

40. A method as claimed in claim 38 wherein a making of the spin valve sensor further comprises the steps of:
   forming an antiferromagnetic second pinning layer exchange coupled to the keeper layer for pinning a magnetic moment of the keeper layer in a second direction antiparallel to said first direction of the magnetic moment of the reference layer; and
   forming the first pinning layer with a higher blocking temperature than a blocking temperature of the second pinning layer.

41. A method as claimed in claim 40 including:
   forming the sense layer with a width at the ABS that defines a track width of the read head; and
   forming each of the keeper layer and the separation insulation layer with a width at the ABS that is greater than said track width.

42. A method as claimed in claim 41 wherein the first pinning layer is formed from a group comprising nickel manganese (Ni-Mn), iridium manganese (Ir-Mn) and platinum manganese (Pt-Mn) and the second pinning layer is nickel oxide (NiO).

43. A method as claimed in claim 42 including:
   forming each of the reference layer, the spacer layer and the sense layer with first and second side edges that are transverse to the ABS;
   forming first and second hard bias layers on the first and second side insulation layers respectively magnetostatically interacted with the first and second side edges respectively of the reference layer and the sense layer; and
   forming conductive first and second lead layers on the first and second hard bias layers respectively and electrically connected to the first and second side edges respectively of the reference layer, the spacer layer and the sense layer.

44. A method as claimed in claim 38 wherein a making of the spin valve sensor further includes the steps of:
   forming a ferromagnetic antiparallel (AP) coupled layer;
   forming an antiferromagnetic second pinning layer exchange coupled to the AP coupled layer for pinning a magnetic moment of the AP coupled layer in a second direction that is parallel to said first direction;
   forming an antiparallel (AP) coupling layer between the keeper layer and the AP coupled layer so that a magnetic moment of the keeper layer is AP coupled through the AP coupling layer in a third direction that is antiparallel to said first and second directions;

forming each of the AP pinned layer and the AP coupling layer with first and second side edges; and forming the first side insulation layer abutting the first side edge of each of the AP coupled layer, the AP coupling layer, the keeper layer and the separation insulation layer and the second side insulation layer abutting the second side edge of each of the AP coupled layer, the AP coupling layer, the keeper layer and the separation insulation layer.

45. A method as claimed in claim 44 including:

forming the sense layer with a width at the ABS that defines a track width of the read head; and forming each of the AP coupled layer, the AP coupling layer, the keeper layer and the separation insulation layer with a width at the ABS that is greater than said track width.

46. A method as claimed in claim 45 including:

forming each of the reference layer, the spacer layer and the sense layer with first and second side edges that are transverse to the ABS;

forming first and second hard bias layers on the first and second side insulation layers respectively magnetostatically interacted with the first and second side edges respectively of the reference layer and the sense layer; and forming conductive first and second lead layers on the first and second hard bias layers respectively and electrically connected to the first and second side edges respectively of the reference layer, the spacer layer and the sense layer.

47. A method of making a magnetic read head that has an air bearing surface (ABS) and a track width at the ABS, comprising;

forming a nonmagnetic electrically insulative first read gap layer;

forming a ferromagnetic keeper material layer, which has a keeper layer portion located between first and second side portions, on the first read gap layer;

forming a nonmagnetic electrically insulative separation insulation material layer having an separation insulation layer portion on the keeper layer portion and first and second side portions on the first and second side portions respectively of the keeper material layer;

forming a bilayer photoresist mask on the separation insulation material layer covering the separation insulation layer portion and the keeper layer portion and leaving the first and second side portions of the separation insulation material layer uncovered;

milling away the first and second side portions of each of the separation insulation material layer and the keeper material layer leaving each of the separation insulation layer portion and the keeper layer portion with first and second side edges;

depositing nonmagnetic electrically insulative first and second side insulation layers with the first side insulation layer abutting the first side edge of each of the separation insulation layer portion and the keeper layer portion and the second side insulation layer abutting the second side edge of each of the separation insulation layer portion and the keeper layer portion;

removing the bilayer photoresist mask;

depositing a ferromagnetic sense material layer, which has a sense layer portion between first and second side portions, on the separation insulation layer portion and the first and second side insulation layers;

depositing a nonmagnetic electrically conductive spacer material layer, which has a spacer layer portion between first and second portions, on the sense layer portion and the first and second side portions respectively of the sense material layer;

depositing a ferromagnetic reference material layer, which has a reference layer portion between first and second side portions, on the spacer layer and the first and second side portions of the sense material layer;

depositing an antiferromagnetic first pinning material layer, which has a first pinning layer portion between first and second side portions, on the reference layer portion and the first and second side portions respectively of the reference material layer;

forming a second bilayer mask on the antiferromagnetic first pinning layer portion leaving first and second side portions of each of the antiferromagnetic first pinning material layer, the reference layer portion, the spacer layer portion and the sense layer portion uncovered by the second bilayer mask;

milling away the first and second portions of each of the antiferromagnetic first pinning material layer, the reference material layer, the spacer material layer and the sense material layer leaving each of the first pinning layer portion, the reference layer portion, the spacer layer portion and the sense layer portion with first and second side edges;

depositing first and second hard bias and lead layers with the first hard bias and lead layers abutting the first side edge of each of the first pinning layer portion, the reference layer portion, the spacer layer portion and the sense layer portion, and the second hard bias and lead layers abutting the second side edge of each of the first pinning layer portion, the reference layer portion, the spacer layer portion and the sense layer portion; and removing the second bilayer photoresist mask.

* * * * *